United States Patent
Yao et al.

(10) Patent No.: US 8,780,433 B2
(45) Date of Patent: Jul. 15, 2014

(54) POLARIZATION SCRAMBLING BASED ON CASCADED OPTICAL POLARIZATION DEVICES HAVING MODULATED OPTICAL RETARDATION

(75) Inventors: Leon Yao, Diamond Bar, CA (US); Xiaojun Chen, San Gabriel, CA (US)

(73) Assignee: General Photonics Corporation, Chino, CA (US)

(*) Notice: Subject to any disclaimer, the term of this patent is extended or adjusted under 35 U.S.C. 154(b) by 104 days.

(21) Appl. No.: 13/247,704

(22) Filed: Sep. 28, 2011

(65) Prior Publication Data
US 2013/0077151 A1    Mar. 28, 2013

(51) Int. Cl.
*G02B 26/00*    (2006.01)
(52) U.S. Cl.
USPC .......................................... 359/290; 359/291
(58) Field of Classification Search
USPC ................................................ 359/290, 291
See application file for complete search history.

(56) References Cited

U.S. PATENT DOCUMENTS

| | | |
|---|---|---|
| 3,302,028 A | 1/1967 | Sterzer |
| 3,625,589 A | 12/1971 | Snitzer |
| 3,684,350 A | 8/1972 | Wentz |
| 3,719,414 A | 3/1973 | Wentz |
| 4,129,357 A | 12/1978 | Title |
| 4,158,506 A | 6/1979 | Collett |
| 4,341,442 A | 7/1982 | Johnson |
| 4,389,090 A | 6/1983 | LeFevre |
| 4,461,543 A | 7/1984 | McMahon |
| 4,478,494 A | 10/1984 | Soref |
| 4,685,773 A | 8/1987 | Carlsen et al. |
| 4,723,315 A | 2/1988 | Wetherell |
| 4,729,622 A | 3/1988 | Pavlath |
| 4,753,507 A | 6/1988 | DePaula et al. |
| 4,787,694 A | 11/1988 | Brambley et al. |
| 4,793,678 A | 12/1988 | Matsumoto et al. |
| 4,798,436 A | 1/1989 | Mortimore |
| 4,898,441 A | 2/1990 | Shimizu |
| 4,902,888 A | 2/1990 | Kondo |
| 4,917,452 A | 4/1990 | Liebowitz |
| 4,923,290 A | 5/1990 | Brinkmeyer et al. |
| 4,958,929 A | 9/1990 | Kondo |
| 4,960,319 A | 10/1990 | Dankowych |
| 4,966,431 A | 10/1990 | Heismann |
| 4,974,930 A | 12/1990 | Blyler, Jr. et al. |
| 4,979,235 A | 12/1990 | Rumbaugh et al. |
| 4,988,169 A | 1/1991 | Walker |

(Continued)

FOREIGN PATENT DOCUMENTS

| | | |
|---|---|---|
| JP | 61-102622 | 5/1986 |
| JP | 05-323243 B2 | 10/2013 |

OTHER PUBLICATIONS

Azzam, R.M.A., "Photopolarimeter using two modulated optical rotators", Optics Letters, 1(5):181-183, Nov. 1977.

(Continued)

*Primary Examiner* — James Jones
(74) *Attorney, Agent, or Firm* — Perkins Coie LLP

(57) ABSTRACT

Techniques and devices use cascaded optical polarization devices having modulated optical retardation to control optical polarization of light and can be configured for polarization scrambling. Uniform rate scrambling and quasi-uniform rate scrambling modes are provided in described devices and rate-additive designs based on multiple cascaded devices are also disclosed to achieve high-speed scrambling.

31 Claims, 10 Drawing Sheets

(56) References Cited

U.S. PATENT DOCUMENTS

| | | | |
|---|---|---|---|
| 5,004,312 | A | 4/1991 | Shimizu |
| 5,081,348 | A | 1/1992 | Siddiqui |
| 5,111,321 | A | 5/1992 | Patel |
| 5,111,322 | A | 5/1992 | Bergano et al. |
| 5,153,676 | A | 10/1992 | Bergh |
| 5,191,387 | A | 3/1993 | Ichikawa et al. |
| 5,212,743 | A | 5/1993 | Heismann |
| 5,243,455 | A | 9/1993 | Johnson et al. |
| 5,247,176 | A | 9/1993 | Goldstein |
| 5,251,057 | A | 10/1993 | Guerin et al. |
| 5,285,507 | A | 2/1994 | Van der Tol |
| 5,288,995 | A | 2/1994 | Strachan |
| 5,317,445 | A | 5/1994 | DeJule et al. |
| 5,373,393 | A | 12/1994 | DeJule et al. |
| 5,381,250 | A | 1/1995 | Meadows |
| 5,473,457 | A | 12/1995 | Ono |
| 5,475,525 | A | 12/1995 | Tournois et al. |
| 5,502,708 | A | 3/1996 | Morimoto |
| 5,561,726 | A | 10/1996 | Yao |
| 5,611,005 | A | 3/1997 | Heismann et al. |
| 5,627,645 | A | 5/1997 | Imagawa et al. |
| 5,675,415 | A | 10/1997 | Akatsu et al. |
| 5,723,856 | A | 3/1998 | Yao et al. |
| 5,740,288 | A | 4/1998 | Pan |
| 5,751,747 | A | 5/1998 | Lutes et al. |
| 5,771,120 | A | 6/1998 | Bergmann |
| 5,777,778 | A | 7/1998 | Yao |
| 5,796,510 | A | 8/1998 | Yao |
| 5,835,270 | A | 11/1998 | Urino et al. |
| 5,892,866 | A | 4/1999 | Bristow et al. |
| 5,903,684 | A | 5/1999 | Payton |
| 5,917,179 | A | 6/1999 | Yao |
| 5,929,430 | A | 7/1999 | Yao et al. |
| 5,930,414 | A | 7/1999 | Fishman et al. |
| 5,963,291 | A | 10/1999 | Wu et al. |
| 5,978,125 | A | 11/1999 | Yao |
| 6,034,799 | A | 3/2000 | Hansen |
| 6,043,887 | A | 3/2000 | Allard et al. |
| 6,075,647 | A | 6/2000 | Braun et al. |
| 6,081,367 | A | 6/2000 | Yokoyama et al. |
| 6,100,944 | A | 8/2000 | Sharp et al. |
| 6,137,925 | A | 10/2000 | Stimple et al. |
| 6,144,450 | A | 11/2000 | Jopson et al. |
| 6,166,845 | A | 12/2000 | Ito et al. |
| 6,175,412 | B1 | 1/2001 | Drevillon et al. |
| 6,177,995 | B1 | 1/2001 | Compain et al. |
| 6,178,036 | B1 | 1/2001 | Yao |
| 6,181,728 | B1 | 1/2001 | Cordingley et al. |
| 6,211,957 | B1 | 4/2001 | Erdogan et al. |
| 6,229,937 | B1 | 5/2001 | Nolan et al. |
| 6,240,220 | B1 | 5/2001 | Pan et al. |
| 6,252,711 | B1 | 6/2001 | Damask et al. |
| 6,275,312 | B1 | 8/2001 | Derks et al. |
| 6,339,489 | B1 | 1/2002 | Bruyere et al. |
| 6,370,285 | B1 | 4/2002 | Naganuma |
| 6,370,286 | B1 | 4/2002 | Krol et al. |
| 6,373,614 | B1 | 4/2002 | Miller |
| 6,377,719 | B1 | 4/2002 | Damask |
| 6,384,916 | B1 | 5/2002 | Furtak |
| 6,388,785 | B2 | 5/2002 | Havstad et al. |
| 6,389,197 | B1 | 5/2002 | Iltchenko et al. |
| 6,396,994 | B1 | 5/2002 | Philipson et al. |
| 6,417,948 | B1 | 7/2002 | Chowdhury et al. |
| 6,417,957 | B1 | 7/2002 | Yao |
| 6,473,218 | B1 | 10/2002 | Maleki et al. |
| 6,476,959 | B2 | 11/2002 | Yao |
| 6,480,637 | B1 | 11/2002 | Yao |
| 6,487,233 | B2 | 11/2002 | Maleki et al. |
| 6,487,336 | B1 | 11/2002 | Yao |
| 6,488,861 | B2 | 12/2002 | Iltchenko et al. |
| 6,493,116 | B1 | 12/2002 | Robinson et al. |
| 6,493,473 | B1 | 12/2002 | Wooten |
| 6,493,474 | B1 | 12/2002 | Yao |
| 6,498,869 | B1 | 12/2002 | Yao |
| 6,498,891 | B1 | 12/2002 | Montesanto et al. |
| 6,535,328 | B2 | 3/2003 | Yao |
| 6,542,650 | B2 | 4/2003 | Khosravani et al. |
| 6,546,159 | B1 | 4/2003 | Peng et al. |
| 6,552,833 | B2 | 4/2003 | Liu et al. |
| 6,556,732 | B1 | 4/2003 | Chowdhury et al. |
| 6,567,167 | B1 | 5/2003 | Chou et al. |
| 6,567,436 | B1 | 5/2003 | Yao et al. |
| 6,576,886 | B1 | 6/2003 | Yao |
| 6,577,445 | B1 | 6/2003 | Damask |
| 6,580,532 | B1 | 6/2003 | Yao et al. |
| 6,594,061 | B2 | 7/2003 | Huang et al. |
| 6,604,871 | B2 | 8/2003 | Cao |
| 6,628,850 | B1 | 9/2003 | Yao |
| 6,628,861 | B1 | 9/2003 | Yao |
| 6,628,862 | B1 | 9/2003 | Yao |
| 6,643,064 | B2 | 11/2003 | Huang et al. |
| 6,661,941 | B1 | 12/2003 | Yao |
| 6,671,464 | B1 | 12/2003 | Kikuchi |
| 6,687,423 | B1 | 2/2004 | Yao |
| 6,707,977 | B2 | 3/2004 | Chien et al. |
| 6,717,706 | B2 | 4/2004 | Miller et al. |
| 6,731,389 | B2 | 5/2004 | Luscombe et al. |
| 6,735,016 | B1 | 5/2004 | Mao et al. |
| 6,754,404 | B2 | 6/2004 | Yao |
| 6,782,211 | B1 | 8/2004 | Core |
| 6,795,481 | B2 | 9/2004 | Maleki et al. |
| 6,795,616 | B2 | 9/2004 | Yao |
| 6,836,327 | B1 | 12/2004 | Yao |
| 6,842,283 | B2 | 1/2005 | Savory et al. |
| 6,847,453 | B2 | 1/2005 | Bush |
| 6,847,484 | B2 | 1/2005 | Damask et al. |
| 6,856,400 | B1 | 2/2005 | Froggatt |
| 6,867,918 | B2 | 3/2005 | Damask |
| 6,873,631 | B2 | 3/2005 | Yao et al. |
| 6,873,783 | B1 | 3/2005 | Yao |
| RE38,735 | E | 5/2005 | Yao |
| 6,891,616 | B2 | 5/2005 | Saitoh et al. |
| 6,891,674 | B2 | 5/2005 | Damask |
| 6,900,932 | B2 | 5/2005 | Chen et al. |
| 6,937,798 | B1 | 8/2005 | Yao et al. |
| 6,944,362 | B2 | 9/2005 | Jasti |
| RE38,809 | E | 10/2005 | Yao |
| 6,975,454 | B1 | 12/2005 | Yan et al. |
| 7,003,183 | B1 | 2/2006 | Phua et al. |
| 7,027,135 | B2 | 4/2006 | Fu et al. |
| 7,027,198 | B2 | 4/2006 | Yao |
| 7,035,538 | B2 | 4/2006 | Willner et al. |
| 7,043,122 | B2 | 5/2006 | Han et al. |
| 7,046,416 | B2 | 5/2006 | Noe et al. |
| 7,067,795 | B1 | 6/2006 | Yan et al. |
| 7,068,896 | B1 | 6/2006 | Kath et al. |
| 7,076,169 | B2 | 7/2006 | Shpantzer et al. |
| 7,079,247 | B2 | 7/2006 | Shribak et al. |
| 7,151,898 | B1 | 12/2006 | Phua et al. |
| 7,154,659 | B1 | 12/2006 | Yao et al. |
| 7,157,687 | B1 | 1/2007 | Yao |
| 7,190,850 | B2 | 3/2007 | Mimura et al. |
| 7,209,670 | B2 | 4/2007 | Fludger et al. |
| 7,218,436 | B2 | 5/2007 | Yao |
| 7,227,686 | B1 | 6/2007 | Yan et al. |
| 7,233,720 | B2 | 6/2007 | Yao |
| 7,245,952 | B2 | 7/2007 | Cameron |
| 7,265,836 | B1 | 9/2007 | Yao |
| 7,265,837 | B1 | 9/2007 | Yao |
| 7,301,632 | B2 | 11/2007 | Hug |
| 7,343,100 | B2 | 3/2008 | Yao |
| 7,372,568 | B1 | 5/2008 | Yao |
| 7,382,962 | B1 | 6/2008 | Yao |
| 7,391,977 | B2 | 6/2008 | Yao |
| 7,436,569 | B2 | 10/2008 | Yao et al. |
| 7,443,504 | B2 | 10/2008 | Sone et al. |
| 7,466,471 | B2 | 12/2008 | Yao |
| 7,522,785 | B2 | 4/2009 | Yao |
| 7,534,990 | B2 | 5/2009 | Yao |
| 7,535,639 | B2 | 5/2009 | Yao et al. |
| 7,693,419 | B1 | 4/2010 | Chen et al. |
| 7,724,435 | B1 | 5/2010 | Yan et al. |
| 7,796,894 | B1 | 9/2010 | Yao |
| 7,945,130 | B2 | 5/2011 | Yan et al. |

(56) References Cited

U.S. PATENT DOCUMENTS

| | | | |
|---|---|---|---|
| 7,952,711 | B1 | 5/2011 | Chen et al. |
| 8,000,610 | B2 | 8/2011 | Yao |
| 8,422,882 | B1 | 4/2013 | Yao |
| 2001/0028760 | A1 | 10/2001 | Yaffe |
| 2001/0052981 | A1 | 12/2001 | Chung et al. |
| 2002/0015547 | A1 | 2/2002 | Patel |
| 2002/0075477 | A1 | 6/2002 | Yu et al. |
| 2002/0191265 | A1 | 12/2002 | LaGasse et al. |
| 2003/0007151 | A1 | 1/2003 | Eckert |
| 2003/0035120 | A1 | 2/2003 | Myatt et al. |
| 2003/0076588 | A1 | 4/2003 | Savory et al. |
| 2003/0081874 | A1 | 5/2003 | Yao |
| 2003/0156776 | A1 | 8/2003 | Han et al. |
| 2003/0206689 | A1 | 11/2003 | Jung et al. |
| 2003/0223056 | A1 | 12/2003 | Fu et al. |
| 2004/0037495 | A1 | 2/2004 | Yao |
| 2004/0223769 | A1 | 11/2004 | Hoshida |
| 2004/0247226 | A1 | 12/2004 | Pyo et al. |
| 2005/0041922 | A1 | 2/2005 | Yao |
| 2005/0078964 | A1 | 4/2005 | Takahara et al. |
| 2005/0129346 | A1 | 6/2005 | Chen et al. |
| 2005/0168659 | A1 | 8/2005 | Melton |
| 2005/0200941 | A1 | 9/2005 | Yao |
| 2005/0201751 | A1 | 9/2005 | Yao |
| 2005/0265728 | A1 | 12/2005 | Yao |
| 2006/0023987 | A1 | 2/2006 | Yao |
| 2006/0115199 | A1 | 6/2006 | Yao |
| 2006/0245706 | A1 | 11/2006 | Kath et al. |
| 2007/0133997 | A1 | 6/2007 | Werner et al. |
| 2007/0223078 | A1 | 9/2007 | Yao et al. |
| 2007/0297054 | A1 | 12/2007 | Yao et al. |
| 2008/0030839 | A1 | 2/2008 | Yao |
| 2008/0054160 | A1 | 3/2008 | Yao |
| 2008/0095487 | A1 | 4/2008 | Granot et al. |
| 2008/0138070 | A1 | 6/2008 | Yan et al. |
| 2008/0159692 | A1 | 7/2008 | Yao |
| 2008/0310470 | A1 | 12/2008 | Ooi et al. |
| 2009/0028565 | A1 | 1/2009 | Yao |
| 2009/0207409 | A1 | 8/2009 | Yao |
| 2009/0213453 | A1 | 8/2009 | Yao |
| 2009/0225420 | A1 | 9/2009 | Yao et al. |
| 2009/0238218 | A1 | 9/2009 | Yao |
| 2010/0239245 | A1* | 9/2010 | Yao .................................. 398/27 |
| 2010/0290738 | A1 | 11/2010 | Yan et al. |

OTHER PUBLICATIONS

Compain, E., et al., "General and Self-Consistent Method for the Calibration of Polarization Modulators, Polarimeters, and Mueller-Matrix Ellipsometers", Applied Optics, 38(16):3490-3502, Jun. 1999.

Damask, J.N., "A Programmable Polarization-Mode Dispersion Emulator for Systematic Testing of 10 Gb/s PMD Compensators," Optical Fiber Communication Conference, vol. 3, pp. 28-30, Mar. 2000.

Damask, J.N., et al., "Demonstration of a Coherent PMD Source," IEEE Photonics Technology Letters, 15 (11):1612-1614, Nov. 2003.

De Martino, A., et al., "Optimized Mueller polarimeter with liquid crystals", Optics Letters, 28(8):616-618, Apr. 2003.

Foschini, G.J., et al., "Probability Densities of Second-Order Polarization Mode Dispersion Including Polarization Dependent Chromatic Fiber Dispersion," IEEE Photonics Technology Letters, 12(3):293-295, Mar. 2000.

Goldstein, D.H., et al., "Error analysis of a Mueller matrix polarimeter", J. Opt. Soc. Am. A, 7(4):693-700, Apr. 1990.

Hauer, M.C., et al., "Electrically Controllable All-Fiber PMD Emulator Using a Compact Array of Thin-Film Microheaters," Journal of Lightwave Technology, 22(4):1059-1065, Apr. 2004.

Karlsson, M., et al., "Autocorrelation function of the polarization-mode dispersion vector," Optics Letters, 24 (14):939-941, Jul. 1999.

Khosravani, R., et al., "Time and Frequency Domain Characteristics of Polarization-Mode Dispersion Emulators," IEEE Photonics Technology Letters, 13(2):127-129, Feb. 2001.

Kogelnik, H., et al., Optical Fiber Telecommunications IV B Systems and Impairments, Chapter 15 "Polarization-Mode Dispersion", pp. 725-861, I.P. Kaminow and T. Li, Eds. Academic Press, 2002.

Lee, J.H., et al., "Statistical PMD Emulator Using Variable DGD Elements," Optical Communication Conference and Exhibit, OFC 2002, pp. 375-376, Mar. 2002.

Lima, A.O., et al., "Statistical Analysis of the Performance of PMD Compensators Using Multiple Importance Sampling," IEEE Photonics Technology Letters, 15(12):1716-1718, Dec. 2003.

Lima, I.T., et al., "Comparison of Polarization Mode Dispersion Emulators," Journal of Lightwave Technology, 19 (12):1872-1881, Dec. 2001.

Noé, R., et al., "Polarization Mode Dispersion Compensation at 10, 20, and 40 Gb/s with Various Optical Equalizers," Journal of Lightwave Technology, 17(9):1602-1616, Sep. 1999.

Rochford, K.B., et al., "Accurate Interferometric Retardance Measurements," Applied Optics, 36(25):6473-6479, Sep. 1997.

Wang, S.X., et al., "Fast wavelength-parallel polarimeter for broadband optical networks", Optics Letters, 29 (9):923-925, May 2004.

Williams, P., "Rotating-Polarizer Polarimeter for Accurate Retardance Measurement," Applied Optics, 36 (25):6466-6472, Sep. 1997.

Williams, P., "Rotating-Wave-Plate Stokes Polarimeter for Differential Group Delay Measurements of Polarization-Mode Dispersion", Applied Optics, 38(31):6508-6515, Nov. 1999.

Willner, A.E., et al., "PMD Emulation," Journal of Optical and Fiber Communications Research, 1(3):181-200, Nov. 2004.

Yan, L, et al., "Repeatable first-order and second-order PMD emulator using binary polarization switches," IEEE Photonics Technology Letters, 20(24):2111-2113, Dec. 2008.

Yan, L.-S., et al., "Experimental Importance Sampling Using a 3-Section PMD Emulator with Programmable DGD Elements," Optical Fiber Communications Conference (OFC 2003), paper ThA4, 4 pages, Mar. 2003.

Yan, L.-S., et al., "High-Speed and Highly Repeatable Polarization-State Analyzer for 40-Gb/s System Performance Monitoring," IEEE Photonics Technology Letters, 18(4):643-645, Feb. 2006.

Yan, L.-S., et al., "High-Speed, Stable and Repeatable PMD Emulator with Tunable Statistics," Optical Fiber Communication Conference (OFC 2003), paper MF6, 5 pages, Mar. 2003.

Yan, L.-S., et al., "Polarization-Mode-Dispersion Emulator Using Variable Differential-Group-Delay (DGD) Elements and Its Use for Experimental Importance Sampling," Journal of Lightwave Technology, 22(4):1051-1058, Apr. 2004.

Yao, X. S., et al., "Highly repeatable all-solid-state polarization-state generator", Optics Letters, 30(11):1324-1326, Jun. 2005.

Aarts, W.H.J., et al., "New endless polarization control method using three fiber squeezers," Journal of Lightwave Technology, 7(7):1033-1043, Jul. 1989.

Alferness, R., "Electrooptic Guided-Wave Device for General Polarization Transformations," IEEE Journal of Quantum Electronics, QE-17(6):965-969, Jun. 1981.

Arrue, J., et al., "Design of Mode Scramblers for Step-Index and Graded-Index Plastic Optical Fibers," Journal of Lightwave Technology, 23(3)1253-1260, Mar. 2005.

Azzam, R.M.A., "In-line light-saving photopolarimeter and its fiber-optic analog," Optics Letters, 12(8):558-560, Aug. 1987.

Boroditsky, et al., "Polarization dynamics in installed fiberoptic systems," Lasers and Electro-Optics Society, the 18th Annual Meeting of the IEEE, p. 414-415, Oct. 2005.

Bouzid, A., et al., "Fiber-optic four-detector polarimeter," Optics Communications, 118(3-4):329-334, Jul. 1995.

Bruyere, F., et al., "Demonstration of an optimal polarization scrambler for long-haul optical amplifier systems," IEEE Photonics Technology Letters, 6(9):1153-1155, Sep. 1994.

Chen, Y.T., et al., "Identification of Cancer/Testis-Antigen Genes by Massively Parallel Signature Sequencing," Proc. Natl. Acad. Sci. USA (PNAS), 102(22):7940-7945, May 2005.

Derr, F., "Coherent optical QPSK intradyne system: concept and digital receiver realization," Journal of Lightwave Technology, 10(9):1290-1296, Sep. 1992.

Granestrand, P., et al., "Active Stabilization of Polarisation on a Single-Mode Fibre," Electronics Letters, 20 (9):365-366, Apr. 1984.

(56) References Cited

OTHER PUBLICATIONS

Hidayet, A., et al., "High-speed endless optical polarization stabilization using calibrated waveplates and field-programmable gate array-based digital controller," Optics Express, 16(23):18984-18991, Nov. 2008.
Ip, E., et al., "Coherent detection in optical fiber systems," Optics Express, 16(2):753-791, Dec. 2008.
Johnson, M., "In-Line Fiber-Optical Polarization Transformer," Applied Optics, 18(9):1288-1289, May 1979.
Kaminow, I., "Polarization in Optical Fibers," IEEE Journal of Quantum Electronics, QE-17(1):15-22, Jan. 1981.
Krummrich, P.M., et al., "Extremely fast (microsecond scale) polarization changes in high speed long hail WDM transmission systems," Proc. OFC 2004, paper F13, 2004.
Krummrich, P.M., et al., "Field trial on statistics of fast polarization changes in long haul WDM transmission systems,"Optical Fiber Communication Conference, OThT6, 3 pages, Mar. 2005.
Lefevre, H.C., "Single-Mode Fiber Fractional Wave Devices and Polarisation Controllers," Electronics Letters, 16 (20):778-780, Sep. 1980.
Leo, P.J., et al., "State of Polarization Changes: Classification and Measurement," Journal of Lightwave Technology, 21(10):2189-2193, Oct. 2003.
Lizé, Y.K., et al., "Fast all-fiber polarization scrambling using re-entrant Lefèvre controller," Optics Communications, 279(1):50-52, Nov. 2007.
Martinelli, M., et al., "Polarization stabilization in optical communications systems," Journal of Lightwave Technology, 24(11):4172-4183, Nov. 2006.
Mehta, A.D., et al., "Detection of Single-Molecule Interactions Using Correlated Thermal Diffusion," Proc. Natl. Acad. Sci. USA (PNAS), 94(15):7927-7931, Jul. 1997.
Monerie, M., "Polarization-Maintaining Single-Mode Fiber Cables: Influence of Joins," Applied Optics, 20 (14):2400-2406, Jul. 1981.
Monerie, M., et al., "Polarization Mode Coupling in Long Single-Mode Fibres," Optical and Quantum Electronics, 12 (6):449-461, Nov. 1980.
Noda, J., et al., "Polarization-Maintaining Fibers and Their Applications," Journal of Lightwave Technology, LT-4 (8):1071-1089, Aug. 1986.
Noe, R., "Endless Polarization Control in Coherent Optical Communications," Electronics Letters, 22(15):772-773, Jul. 1986.
Noe, R., et al., "Endless Polarization Control Systems for Coherent Optics," Journal of Lightwave Technology, 6 (7):1199-1207, Jul. 1988.
Okoshi, T., "Polarization-State Control Schemes for Heterodyne or Homodyne Optical Fiber Communications," Journal of Lightwave Technology, LT-3(6):1232-1237, Dec. 1985.
Okoshi, T., "Recent Advances in Coherent Optical Fiber Communication Systems," Journal of Lightwave Technology, LT-5(1):44-52, Jan. 1987.
Park, K.J., et al., "PMD-induced crosstalk in the presence of polarization scrambling," IEEE Photonics Technology Letters, 16(11)2580-2582, Nov. 2004.
Park, P.K.J., et al., "Optimization of polarization-scrambling frequency in lightwave systems," Optical Engineering, 47 (3):035005-1-4, Mar. 2008.
Peterson, D.L., et al., "Field measurements of state of polarization and PMD from a tier-1 carrier," Optical Fiber Communication Conference, Technical Digest, Optical Society of America, 2004, paper FI1, 4 pages.
Sakai, J., et al., "Birefringence and Polarization Characteristics of Single-Mode Optical Fibers under Elastic Deformations," IEEE Journal of Quantum Electronics, QE-17(6):1041-1051, Jun. 1981.
Schlager, J.B., et al., "Annealed Optical Fibre Mode Scrambler," Electronics Letters, 37(1):9-10, Jan. 2001.
Scholl, B., et al., "In-line fiber optic polarimeter with a 99% coupler," Optical Engineering, 34(6):1669-1672, Jun. 1995.
Shimizu, H., et al., "Highly Practical Fiber Squeezer Polarization Controller," Journal of Lightwave Technology, 9 (10):1217-1224, Oct. 1991.
Smith, A.M., "Birefringence Induced by Bends and Twists in Single-Mode Optical Fiber," Applied Optics, 19 (15):2606-2611, Aug. 1980.
Smith, A.M., "Single-Mode Fibre Pressure Sensitivity," Electronics Letters, 16(20):773-774, Sep. 1980.
Sobiski, D., et al., "Fast first-order PMD compensation with low insertion loss for 10Gbit/s system," Electronics Letters, 37(1):46-48, Jan. 2001.
Stolovitzky, G.A., et al., "Statistical analysis of MPSS measurements: Application to the study of LPS-activated macrophage gene expression," Proc. Natl. Acad. Sci. USA (PNAS), 102(5):1402-1407, Feb. 2005.
Su, C.B., "Achieving variation of the optical path length by a few millimeters at millisecond rates for imaging of turbid media and optical interferometry: a new technique," Optics Letters, 22(10):665-667, May 1997.
Taylor, M.G., "Coherent detection method using DSP for demodulation of signal and subsequent equalization of propagation impairments," IEEE Photonics Technology Letters, 16(2):674-676, Feb. 2004.
Tearney, G.J., et al., "High speed phase- and group-delay scanning with a grating-based phase control delay line," Optics Letters, 22(23):1811-1813, Dec. 1997.
Tearney, G.J., et al., "Rapid Acquisition of in vivo Biological Images by Use of Optical Coherence Tomography," Optics Letters, 21(17):1408-1410, Sep. 1996.
Ulrich, R., et al., "Polarization optics of twisted single-mode fibers," Applied Optics, 18(13):2241-2251, Jul. 1979.
Westbrook, P.S., et al., "In-Line Polarimeter Using Blazed Fiber Gratings," IEEE Photonics Technology Letters, 12 (10):1352-1354, Oct. 2000.
White, I.H., et al., "Optical Local Area Networking Using CWDM," Proc. SPIE Waveguides and Networking, vol. 5248, pp. 284-293, Dec. 2003.
Yan, L.S., et al., "Uniformly distributed states of polarization on the Poincare Sphere using an improved polarization scrambling scheme," Optics Communications, 249(1-3):43-50, May 2005.
Yang, W., et al., "Rapid ultrafine-tunable optical delay line at the 1.55-?m wavelength," Optics Letters, 23 (23):1843-1845, Dec. 1998.
Yao, S., "Polarization in fiber systems: squeezing out more bandwidth," The Photonics Handbook, Laurin Publishing, Pittsfield, Massachusetts, 5 pages, 2004.
Yasa, Z.A., et al., "A Rapid-Scanning Autocorrelation Scheme for Continuous Monitoring of Picosecond Laser Pulses," Optics Communications, 36(5):406-408, Mar. 1981.

\* cited by examiner

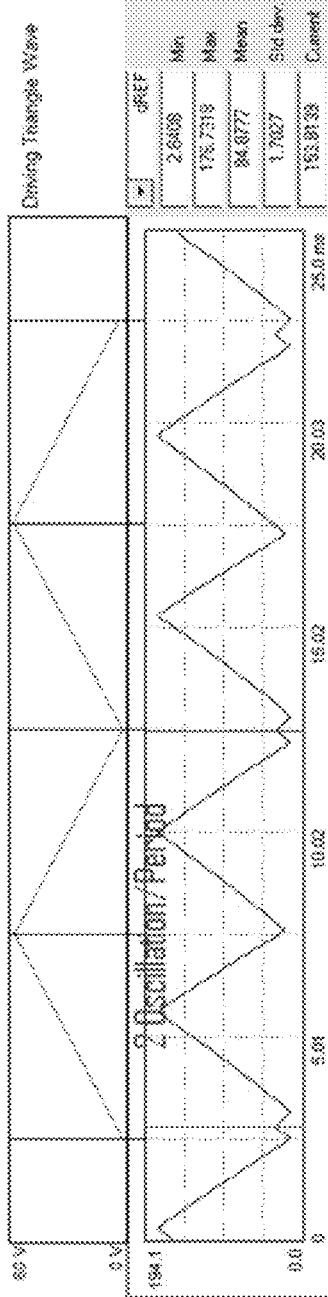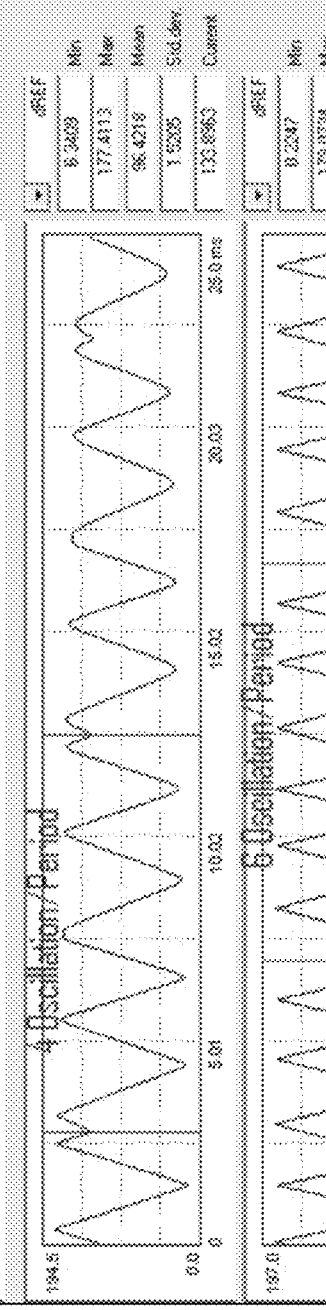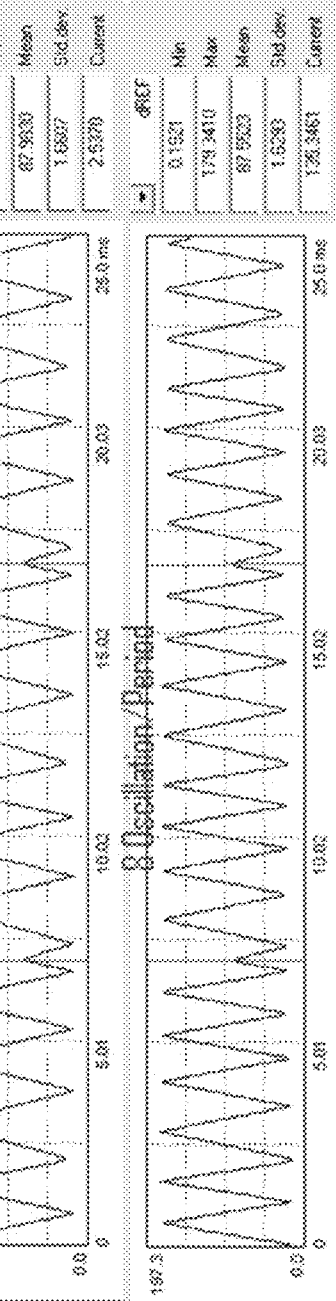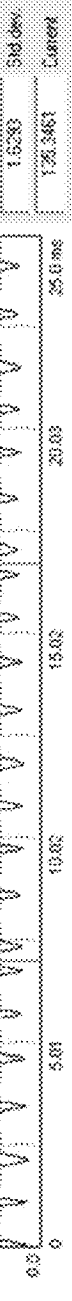
FIG. 8A
FIG. 8B
FIG. 8C
FIG. 8D
FIG. 8E

US 8,780,433 B2

POLARIZATION SCRAMBLING BASED ON CASCADED OPTICAL POLARIZATION DEVICES HAVING MODULATED OPTICAL RETARDATION

BACKGROUND

This patent document relates to techniques and optical devices that control or manipulate optical polarization of light.

Optical polarization, or state of polarization (SOP), is an important property of light that can impact or affect a wide range of optical and photonic devices. In optical communications, for example, as the bit rate per wavelength channel increases from 10 giga bit per second (Gbps) to 40 Gbps, 100 Gbps, and beyond, polarization issues become increasingly critical. In particular, the time-varying polarization mode dispersion (PMD), polarization dependent loss (PDL), and state of polarization (SOP) can cause the bitwidth to spread and signal level to fluctuate with time, and may increase the system's bit-error-rate (BER). Therefore, performance tests of an optical communication system against these polarization-related parameters PMD, PDL, and SOP can be desirable for assuring the healthy operation of high speed fiber optic communication systems. A polarization scrambling device for changing SOP at a controllable speed to reach all possible SOPs can be used to test the performance of the high speed fiber optic communication systems against rapid SOP variations.

SUMMARY

This patent document provides techniques and devices for controlling optical polarization of light based on cascaded optical polarization devices having modulated optical retardation. The described techniques and devices can be used for polarization scrambling.

In one aspect, a method for controlling optical polarization of light is provided to include directing input light through, sequentially, a first optical polarization device configured to have optical birefringence with a first optical axis perpendicular to a propagation direction of the input light, a second optical polarization device configured to have optical birefringence with a second optical axis perpendicular to a propagation direction of received light and at 45 degrees with respect to the first optical axis of the first optical polarization device, a third optical polarization device configured to have optical birefringence with a third optical axis at 45 degrees with respect to the second optical axis of the second optical polarization device, and one or more additional optical polarization devices located downstream from the third optical polarization device and each configured to have an optical axis along the third optical axis. This method includes modulating the first optical polarization device at a first modulation frequency to produce a first modulated phase retardation on light output by the first optical polarization device; modulating the second optical polarization device at a second modulation frequency to produce a second modulated phase retardation on light output by the second optical polarization device; modulating the third optical polarization device at a third modulation frequency to produce a third modulated phase retardation on light output by the third optical polarization device; and modulating the one or more additional optical polarization devices located downstream from the third optical polarization device to produce additional phase retardation modulation on light output from the third optical polarization device. One of the first, second and third modulation frequencies is different from the other two of the first, second and third modulation frequencies.

In another aspect, an optical device is provided for controlling optical polarization of light and includes a first optical polarization device that receives input light and is configured to have optical birefringence with a first optical axis perpendicular to a propagation direction of the input light, the first optical polarization device configured to operate on light to produce a first phase retardation on output light that varies with a first control signal applied to the first optical polarization device; a second optical polarization device located downstream from the first optical polarization device and configured to have optical birefringence with a second optical axis at 45 degrees with respect to the first optical axis and perpendicular to the propagation direction of received light, the second optical polarization device configured to operate on light to produce a second phase retardation on output light that varies with a second control signal applied to the second optical polarization device; and a third optical polarization device located downstream from the second optical polarization device and configured to have optical birefringence with a third optical axis at 45 degrees with respect to the second optical axis and perpendicular to the propagation direction of received light, the third optical polarization device configured to operate on light to produce a third phase retardation on output light that varies with a third control signal applied to the third optical polarization device. This device includes one or more additional optical polarization devices located downstream from the third optical polarization device and each configured to have optical birefringence with an optical axis along the third optical axis, each additional optical polarization device configured to operate on light to produce a respective phase retardation on output light that varies with a respective additional control signal applied to the additional optical polarization device; and a control module that produces the first, second, third and one or more additional control signals and modulates each control signal at a respective modulation frequency to vary a respective phase retardation on respective output light produced by a respective optical polarization device, wherein one of the first, second and third control signals is different in modulation frequency from the other two of the first, second and third control signals.

In another aspect, an optical device is provided for controlling optical polarization of light and includes optical retardation modulators cascaded to form an optical path that receives input light and produces output light. Each optical retardation modulator is configured to modulate the input light to produce a phase retardation modulation at a modulation frequency and have optical birefringence with a respective optical axis perpendicular to received light. The first three optical retardation modulators at a beginning part of the optical path are arranged to have their optical axes oriented at 45 degrees between two adjacent optical retardation modulators. A control module is coupled to the optical retardation modulators to control phase retardation modulation of the optical retardation modulators, respectively, to produce modulation control signals to the first three optical retardation modulators at the beginning side of the optical path at different modulation frequencies and to control optical retardation modulators downstream from the first three optical retardation modulators to control optical polarization and to additionally modulate optical retardation of the light output from the first three optical retardation modulators to scramble optical polarization of the output light.

In yet another aspect, a device for controlling optical polarization of light is provided to include a first optical polarization device that receives input light and is configured to have optical birefringence with a first optical axis perpendicular to a propagation direction of the input light, the first optical polarization device configured to operate on light to produce a first phase retardation on output light that varies with a first control signal applied to the first optical polarization device; a polarization maintaining fiber that directs light to the first optical polarization device where the polarization maintaining fiber is oriented to have a fast or slow optical axis of the polarization maintaining fiber to be at 45 degrees with respect to the first optical axis of the first optical polarization device; and a second optical polarization device located downstream from the first optical polarization device and configured to have optical birefringence with a second optical axis at 45 degrees with respect to the first optical axis and perpendicular to the propagation direction of received light, the second optical polarization device configured to operate on light to produce a second phase retardation on output light that varies with a second control signal applied to the second optical polarization device. This device includes a control module that produces the first and second control signals and modulates each control signal at a respective modulation frequency to vary a respective phase retardation on respective output light produced by a respective optical polarization device.

Various aspects of the described techniques and devices are described in detail in the drawings, the description and the claims.

BRIEF DESCRIPTION OF DRAWINGS

FIGS. 8A-8E show examples of SOP variations under the additive rate operation in cascaded fiber squeezers as shown in FIG. 1.

DETAILED DESCRIPTION

Optical polarization scramblers can be made with polarization controllers and can be programmed so that SOP traces uniformly cover the whole Poincaré sphere. Some polarization scramblers are made with a SOP changing rate following Rayleigh Distribution, mainly for emulating SOP variations in a real fiber optic transmission system for statistical system testing. Other scramblers are made to change SOP as fast and randomly as possible for mitigating polarization related transmission impairments, with unspecified scrambling rate distributions.

As the need for communication bandwidth in optical fiber networks continues to increase, various techniques (e.g., polarization multiplex and coherent detection) have been implemented for increasing the transmission speed to reach higher speeds, e.g., 40 Gbps and beyond. It has been reported that SOP changing rate in a real fiber optic system can be as high as 300 k rad/s. Therefore, for testing the performance of coherent detection systems, a polarization scrambling scheme must be able to generate SOP changes faster than the SOP rate in the fiber systems. For the deterministic test of the polarization response of coherent receivers, a uniform rate polarization scrambling is desired, because non-uniform rate polarization scrambling introduces large test uncertainty and less test repeatability. It is technically challenging to simultaneously satisfy both the uniform rate and high scrambling speed requirements.

The techniques and devices described in this document implement cascaded optical polarization devices having modulated optical retardation to control optical polarization of light. The described techniques and devices can be configured or implemented for scrambling optical polarization in ways to achieve both the uniform or quasi-uniform SOP rate and relatively high scrambling speeds.

Polarization scrambling can be achieved or realized by programming a polarization controller with a certain control algorithm such that the output SOP changes with time and distributed uniformly over the whole Poincaré sphere. The examples provided below use variable retarder based polarization controllers to realize polarization scrambling with desired speeds and uniform rates for various applications, e.g., testing the performance of coherent receivers. Fiber squeezers can be implemented as such phase retarders and can be used to achieve one or more advantages, e.g., low insertion loss, low PDL, low activation loss, or/and low cost.

Figure 1:
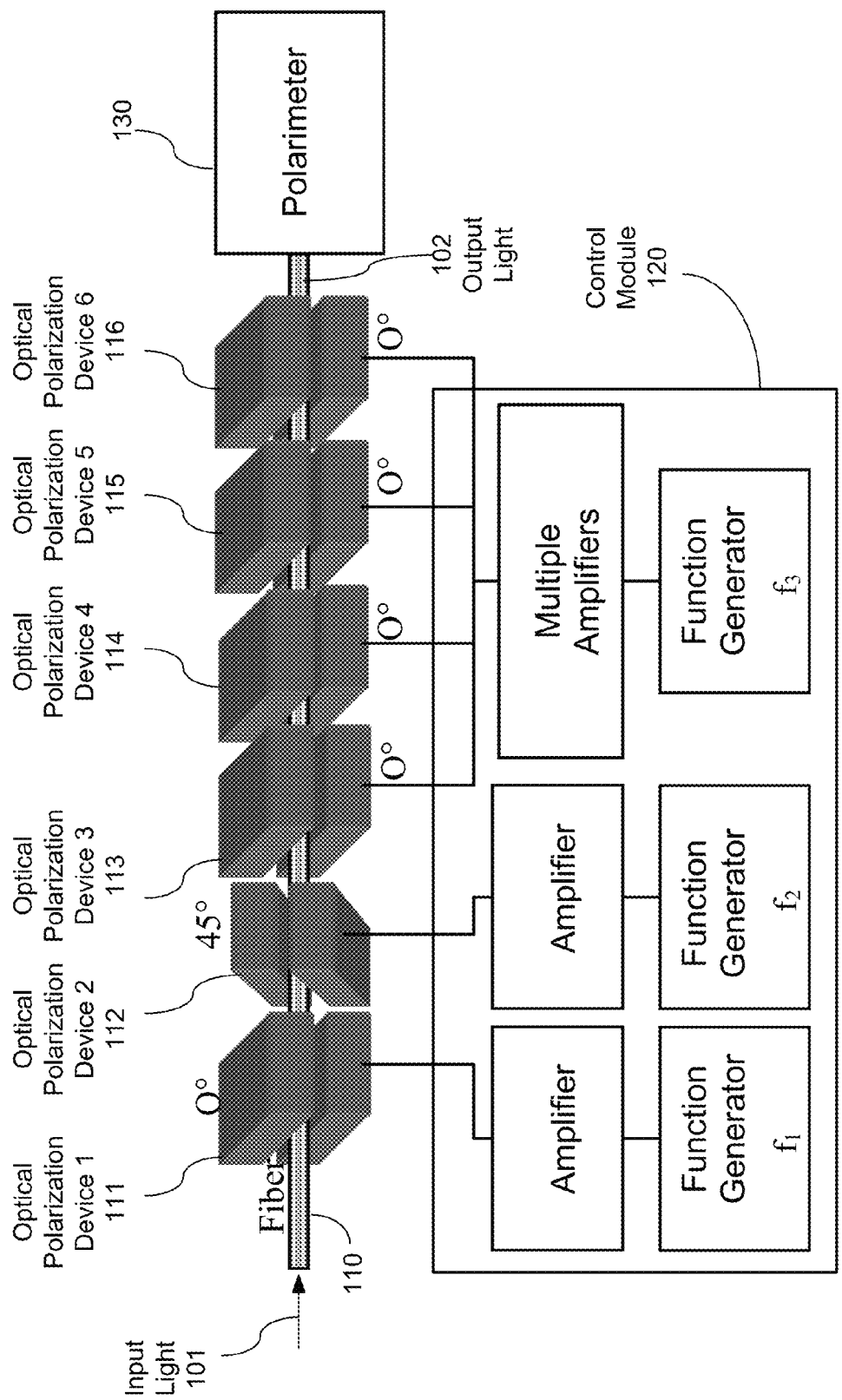
FIG. 1 shows an example of an optical device based on cascaded optical polarization devices having modulated optical retardation.

FIG. 1 shows an example of an optical device for controlling optical polarization and for scrambling optical polarization in a controlled manner. This device includes multiple optical polarization devices 111, 112, 113, 114, 115 and 116 that are cascaded to form an optical path to process input light 101 and to produce output light 102. Each of the optical polarization devices 111-116 can be used to perform two operations on the light: modulating the optical retardation of the light at a respective modulation frequency and controlling output polarization. Each optical polarization device is designed to have optical birefringence with an optical axis perpendicular to the propagation direction of the received light at the device. For a uniaxial birefringent waveplate, the optical axis can be the extraordinary optic axis or ordinary optic axis. For a fiber squeezer, the optical axis can be along the squeezing direction for squeezing the fiber. At least some of the optical polarization devices 111-116 are configured to control output light at different optical polarizations and modulate the optical retardation at different modulation frequencies. The optical polarization devices 111-116 are configured and controlled, collectively, to produce a desired output polarization state in the output light 102, e.g., a uniform or quasi-uniform SOP rate and a relatively high scrambling speed in scrambling the optical polarization in the output light 102.

This device in FIG. 1 and other devices described in this document can be implemented by free-space optical elements, waveguide-based optical elements or a combination of both types of optical elements. The example in FIG. 1 shows a fiber based device as an example of a waveguide-based device design. A fiber 110, e.g., a single mode (SM) fiber, can be used to guide and carry the input light 101 through the multiple optical polarization devices 111, 112, 113, 114, 115 and 116. Depending on the designs of the optical polarization devices, the fiber 110 can include fiber segments that interconnect the optical polarization devices 111-116 (e.g., variable optical wave plates) or as a contiguous fiber that is engaged to the optical polarization devices 111-116 (e.g., fiber squeezers).

In the example in FIG. 1, the first three optical polarization devices 111, 112 and 113 are oriented with a relative optical axis orientation at 45 degrees from one another. The first optical polarization device 111 receives the input light 101 and is configured to output light in a first optical polarization (e.g., 0 degree) and to produce a first phase retardation on output light that varies with a first control signal applied to the first optical polarization device 111 at a first modulation frequency (f1). The second optical polarization device 112 is located downstream from the first optical polarization device 111 and its optical axis is oriented at 45 degrees with respect to the first optical polarization device 111. The second optical polarization device 112 is configured to operate on light to produce a second phase retardation on output light that varies with a second control signal applied to the second optical polarization device 112 at a second modulation frequency (f2). The third optical polarization device 113 is located downstream from the second optical polarization device 112, and configured to output light in a third optical polarization and its optical axis is oriented at 45 degrees with respect to the second optical polarization device 112. The third optical polarization device 113 is configured to operate on light to produce a third phase retardation on output light that varies with a third control signal applied to the third optical polarization device 113 at a third modulation frequency (f3). The device in FIG. 1 also includes one or more additional optical polarization devices 114-116 located downstream from the third optical polarization device 113 and their optical axes are oriented at 0 degrees with respect to the third optical polarization device 113. Each additional optical polarization device is configured to operate on light to produce a respective phase retardation on output light that varies with a respective additional control signal applied to the additional optical polarization device at a modulation frequency. In the example shown in FIG. 3, all three additional optical polarization devices 114-116 are modulated at the same modulation frequency (f3) at the third optical polarization device 113.

The device in FIG. 1 includes a control module 120 that produces the first, second, third and one or more additional control signals for the devices 111-116. The control module 120 modulates each control signal at a respective modulation frequency to vary a respective phase retardation on respective output light produced by a respective optical polarization device. In implementations described below, one of the first, second and third control signals is different in modulation frequency from the other two of the first, second and third control signals. For example, the devices 111, 112 and 113 are modulated at modulation frequencies f1, f2 and f3 that can be different from one another. For adequate polarization scrambling the SOP over the Poincaré sphere, the first modulation frequency f1 of the first device 111 may be higher than the second modulation frequency f2 of the second device 112. The third modulation frequency f3 of the third device 113 may be set higher than modulation frequencies f1 and f2. Details of the different operation modes are provided below.

The control module 120 may be configured in various configurations. In the exemplary configuration in FIG. 1, the control module 120 includes separate function generators for generating the modulation control signals, respectively, in some implementations. Signal amplifiers are provided between the devices 111-116 and the function generators to amplify and control the magnitudes of the modulation control signals. The control signals for the devices 113-116 in this example are shown to be derived from a common control signal at the frequency f3 from a common function generator.

Various measurements or operations may be performed on the output light 102 which has scrambled polarization state and can be used for conducting performance tests. In FIG. 1, a polarimeter 130 is shown to measure the polarization of the output light 102. The output light 102 can be directed to a different instrument.

Figure 2:
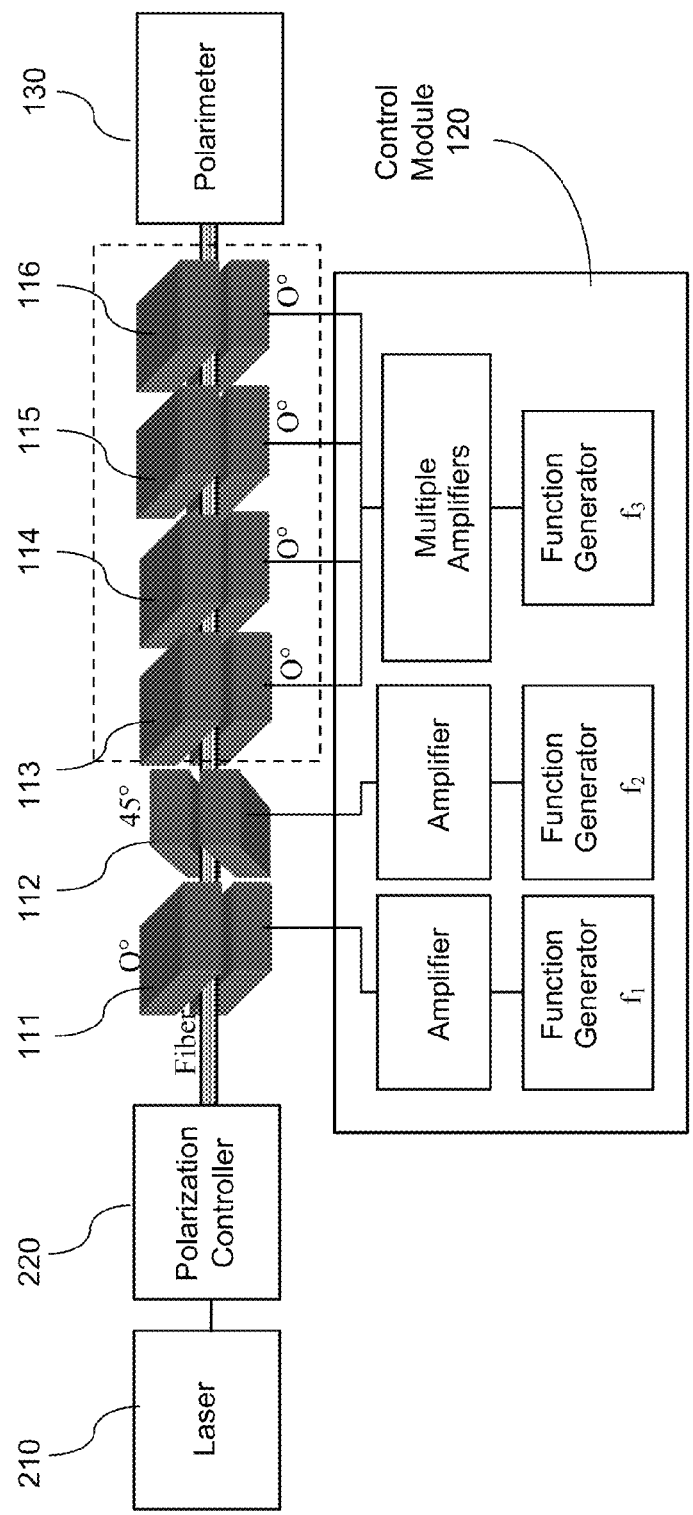
FIG. 2 shows an exemplary implementation of the device in FIG. 1.

FIG. 2 shows one implementation of the device in FIG. 1 and can be used to test various operations of the device in FIG. 1. In FIG. 2, a laser 210 is provided to generate the input light 102. An input optical polarization controller 220 inserted in the optical path between the devices 111-116 and the laser 210 to control the optical polarization of the input light 102 when enters the very first optical polarization device 111. For example, the polarization controller 220 can set the input polarization of the light 102 to be at 45 degrees with respect to the first polarization of the device 111. The devices 111-116 in FIG. 2 are fiber squeezers that are engaged onto the fiber to apply pressures on the fiber under the modulation control signals from the control module 120 to modulate the local retardation values.

The device in FIG. 2 can be controlled to operate under various operational schemes for obtaining uniform and quasi-uniform rate polarization scrambling in fiber optic systems. Tests conducted on the device in FIG. 2 demonstrate scrambled SOP can be achieved to uniformly cover the whole Poincaré sphere and that the scrambling rates can be controlled to be concentrated towards the high end of the rate distribution histogram. This device can be used to implement an operating method for multiplying scrambling rates to overcome the speed limitation of fiber squeezers by cascading multiple fiber squeezers together. This device can be used for combining the quasi-uniform rate scheme with the rate multiplication to achieve polarization scrambling with a quasi-uniform rate. Preliminary tests on the device in FIG. 2 showed a high quasi-uniform rate at 376 k rad/s. Such a high scrambling scheme can be advantageous for the deterministic characterization of the performance of modern fiber optic transceivers, including those deploying coherent detection techniques, against rapid polarization variations. The operation of the device in FIG. 2 can be controlled to be wavelength insensitive and may be scalable to higher scrambling rates by adding more phase plates or fiber squeezers or being doubled by reflecting light back to the fiber squeezers.

FIG. 2 shows six fiber squeezers that are cascaded in series where the first three fiber squeezers are oriented 45 degrees from one another, and the last three fiber squeezers have the same orientation as the third squeezer for overcoming the speed limitation of the fiber squeezers, as will be explained below.

In implementations, the phase retardation modulation amplitude for each optical polarization device in FIGS. 1 and 2 can be $2\pi m$ (m=1, 2, 3, ...). The modulation signal applied to each optical polarization device for modulating the phase retardation can be a periodic triangle wave to achieve a linear and uniform ramp rate in increasing or decreasing the phase retardation. Other periodic wave forms can be used for the modulation, including, e.g., sine or cosine waves.

Simulations for the operation of the device in FIG. 2 were conducted to show how SOP varies when a specific scrambling scheme is applied to the fiber squeezers. Such simulations are used to verify the feasibility of new polarization scrambling ideas and learn how different parameters affect scrambling in the device in FIG. 2. A Labview simulation was developed to calculate SOP variations caused by n fiber squeezers of different orientations when they are driven by n electrical signals of different waveform, frequencies, and amplitude, and display SOP traces on Poincaré sphere. The simulation program was also designed to calculate the SOP variation rate and to provide data for the rate distribution histogram. The time or point averaged DOP can also be obtained with the program to reflect SOP coverage uniformity of a particular scrambling scheme.

In the simulation program, ith fiber squeezer wave plate is represented by a Mueller Matrix:

$$\tilde{M}_i = \begin{pmatrix} 1 & 0 & 0 & 0 \\ 0 & \cos 4\theta_i \sin^2 \phi_i/2 + \cos^2 \phi_i/2 & \sin 4\theta_i \sin^2 \phi_i/2 & 0 \\ 0 & \sin 4\theta_i \sin^2 \phi_i/2 + \cos^2 \phi_i/2 & -\cos 4\theta_i \sin^2 \phi_i/2 + \cos^2 \phi_i/2 & -\cos 2\theta_i \sin \phi_i \\ 0 & 0 & \cos 2\theta_i \sin \phi_i & \cos \phi_i \end{pmatrix},$$

where $\theta_i$ is the orientation angle and $\phi_i$ is the retardation of the fiber squeezer. The Stokes vector of $\bar{S}_{i,i}$ the output SOP from ith fiber squeezer is obtained by multiplying its Muller matrix $\tilde{M}_i$ with the previous Stokes vector $\bar{S}_{i-1}$ $$\bar{S}_i = \tilde{M}_i \bar{S}_{i-1}$$

The SOP variation rate is obtained by first finding two consecutive points $\vec{S}_m$ and $\vec{S}_n$ on the SOP trace and calculating the angle between the two points using:

$$\cos \theta_{mn} = \vec{S}_m \cdot \vec{S}_n / |\vec{S}_m||\vec{S}_n|,$$

where $\vec{S} \cdot \vec{S}_n$ is the dot product of the two SOP vectors, $|\vec{S}_m|$ and $|\vec{S}_n|$ are the magnitudes of $\vec{S}_m$ and $\vec{S}_n$, respectively. The SOP changing rate between the two points is the angle divided by the time interval between the two points. The rate distribution can be obtained by calculating all the rates between two adjacent SOP points and displaying them on a histogram.

The averaged DOP of the scrambled polarization can be calculated using $$<DOP> = \sqrt{<S_1>^2 + <S_2>^2 + <S_3>^2}/S_0$$

where $S_0$, $S_1$, $S_2$, $S_3$ are Stokes vector components, respectively, and $<>$ denotes for either time or point average. The simulation can be used to evaluate operations of different scrambling schemes with different combinations of driving frequencies and can be used to determine which scheme has the desired SOP coverage uniformity and scrambling rate distribution.

In FIG. 2, the retardation of each fiber squeezer is varied linearly by applying a driving voltage to the piezo-electric actuator on the fiber squeezer. As the retardation is varied from 0 to $2\pi$, the output SOP from the fiber squeezer traces out a complete circle on the Poincaré sphere.

Figure 3B:
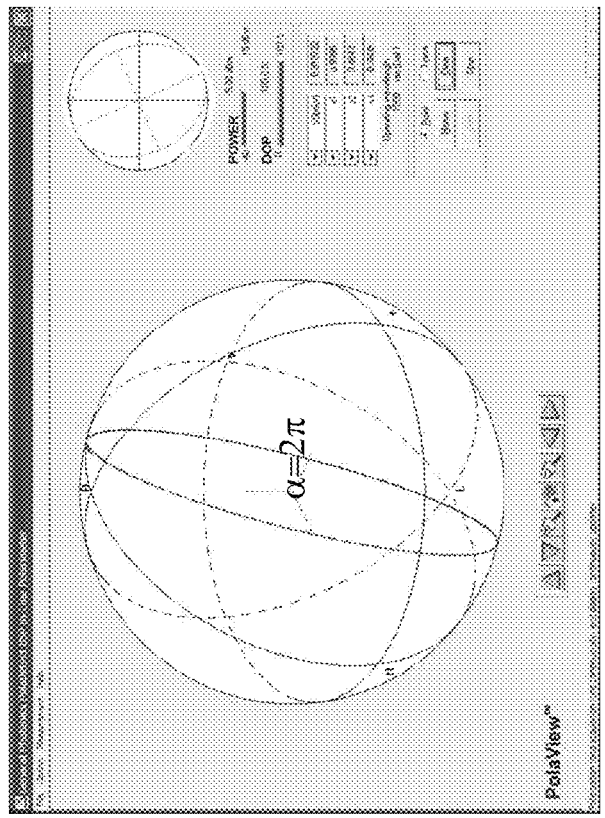
FIGS. 3A and 3B show various values of the state of polarization (SOP) of light on the Poincaré sphere representation where the retardation is varied from 0 to $2\pi$ and the output SOP from the fiber squeezer traces out a complete circle on the Poincaré Sphere.
Figure 3A:
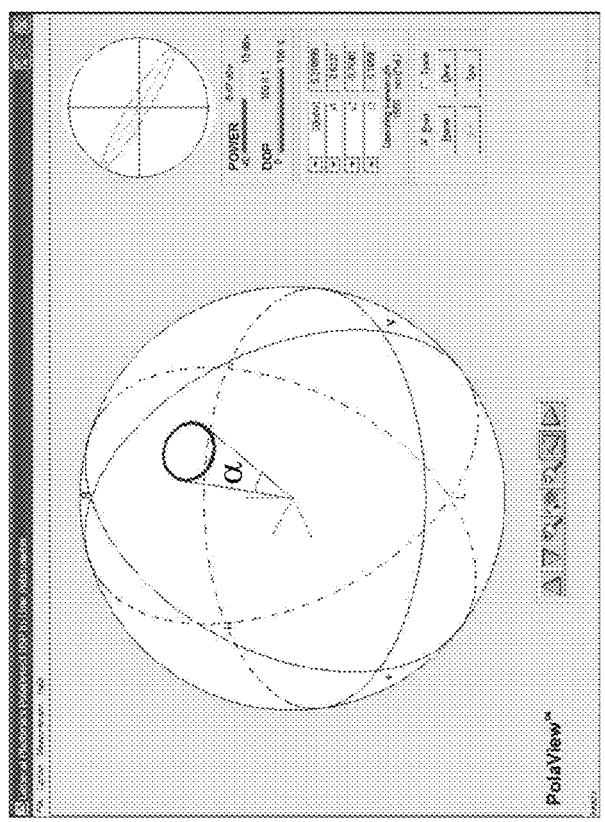

FIGS. 3A and 3B show some simulation results. In FIG. 3A, the fiber squeezers are controlled to trace the SOP a small circle on Poincaré sphere where the SOP variation angle $\alpha$ is small (a small fraction of $2\pi$) and so is the SOP changing rate. In FIG. 3B, the fiber squeezers are controlled to make SOP trace out a large circle on Poincaré sphere corresponding to the case that input SOP to the wave plate is 45 degree from its birefringence axis, the angular change per circle reaches its largest value of $2\pi$. The corresponding SOP changing rate under this condition is large. The radius of the circle depends on the input SOP with respect to birefringence axis of the variable phase plate: 45 degree results in the largest circle on the Sphere while a small or large angle produces small SOP changes and hence small radius. In addition, for a given retardation variation of the fiber squeezer, the SOP variation rate is proportional to the radius of curvature of the SOP trace. The largest radius of curvature produces the largest rate of SOP variation for a given retardation variation, as shown in FIGS. 3A and 3B.

Two circular traces generated by two adjacent fiber squeezers with a relative orientation of 45 degrees are orthogonal from each other. It can be shown that at least three fiber squeezers are required to generate SOPs to cover the whole Poincaré sphere from any input SOP. For programming the fiber squeezers for effective polarization scrambling, four parameters on the driving signals can be selected: waveform, frequency, amplitude, and phase. The polarization scrambling can be characterized by various parameters, such as 1) SOP coverage uniformity, 2) maximum scrambling rate, and 3) scrambling rate distribution.

SOP coverage uniformity measurement indicates how uniform SOPs are distributed on Poincaré sphere after a certain time, and can be characterized by observing SOP distribution on Poincaré sphere and average DOP over time or over SOP points. The point-averaged degree of polarization (DOP) is a good indicator for uniform SOP coverage. The smaller the averaged DOP, the better the SOP uniformity is. If the scrambled SOP can reach the entire sphere with equal probability, the averaged DOP will be zero.

Figure 4:
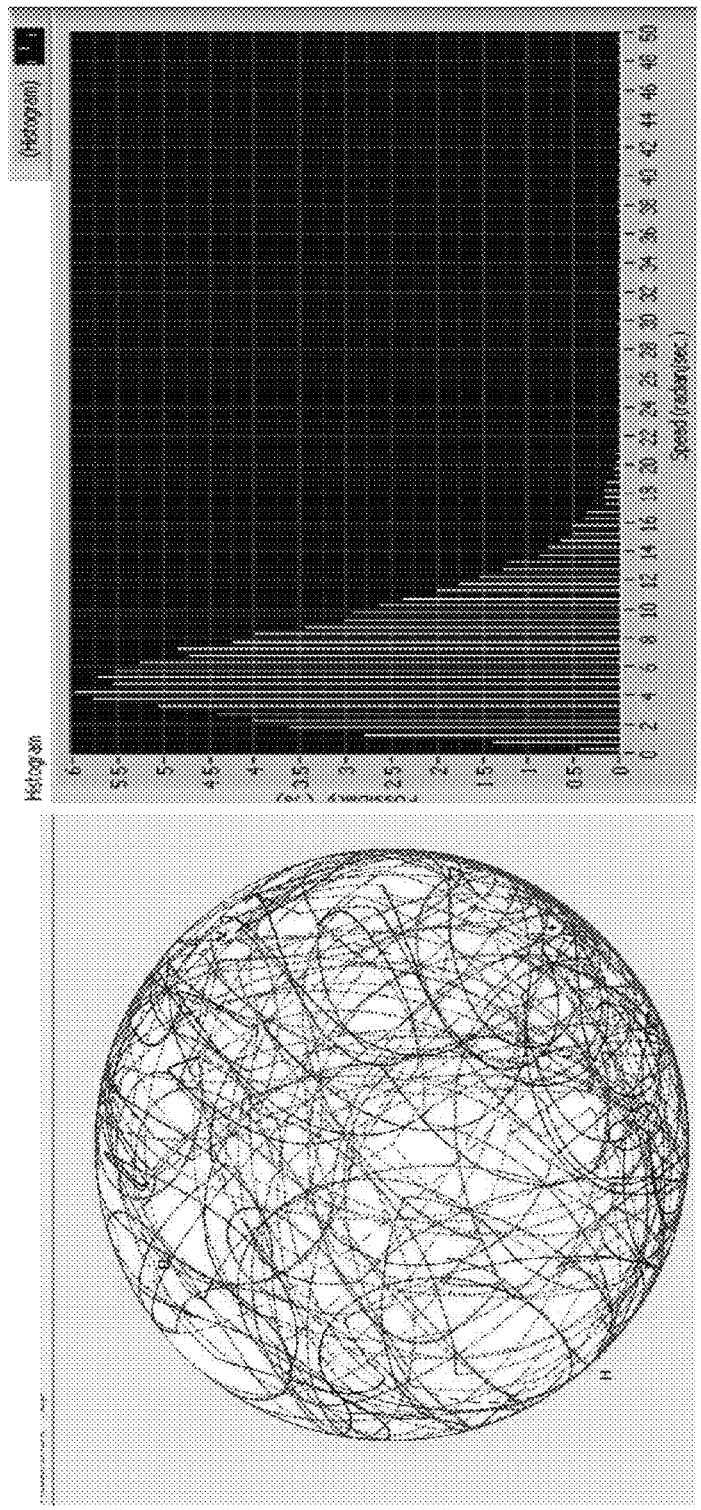
FIG. 4 shows an example of SOP trace that moves randomly on Poincaré Sphere with time and covers the whole sphere uniformly, where the left hand side figure shows the random SOP variation and the right hand side figures shows the corresponding SOP variation rate histogram following Rayleigh distribution.

FIG. 4 shows the SOP distribution for polarization scramblers that are operated to make SOP trace move randomly on Poincaré sphere with time to uniformly cover the whole sphere. The random varying trace caused by such random operation causes the corresponding radius of curvature of the SOP trace to change randomly. This results in a wide spread of SOP variation rates, as shown by the rate distribution on the right hand side figure in FIG. 4. Such a wide rate distribution is not desirable for testing the polarization response of coherent receivers.

Figure 5:
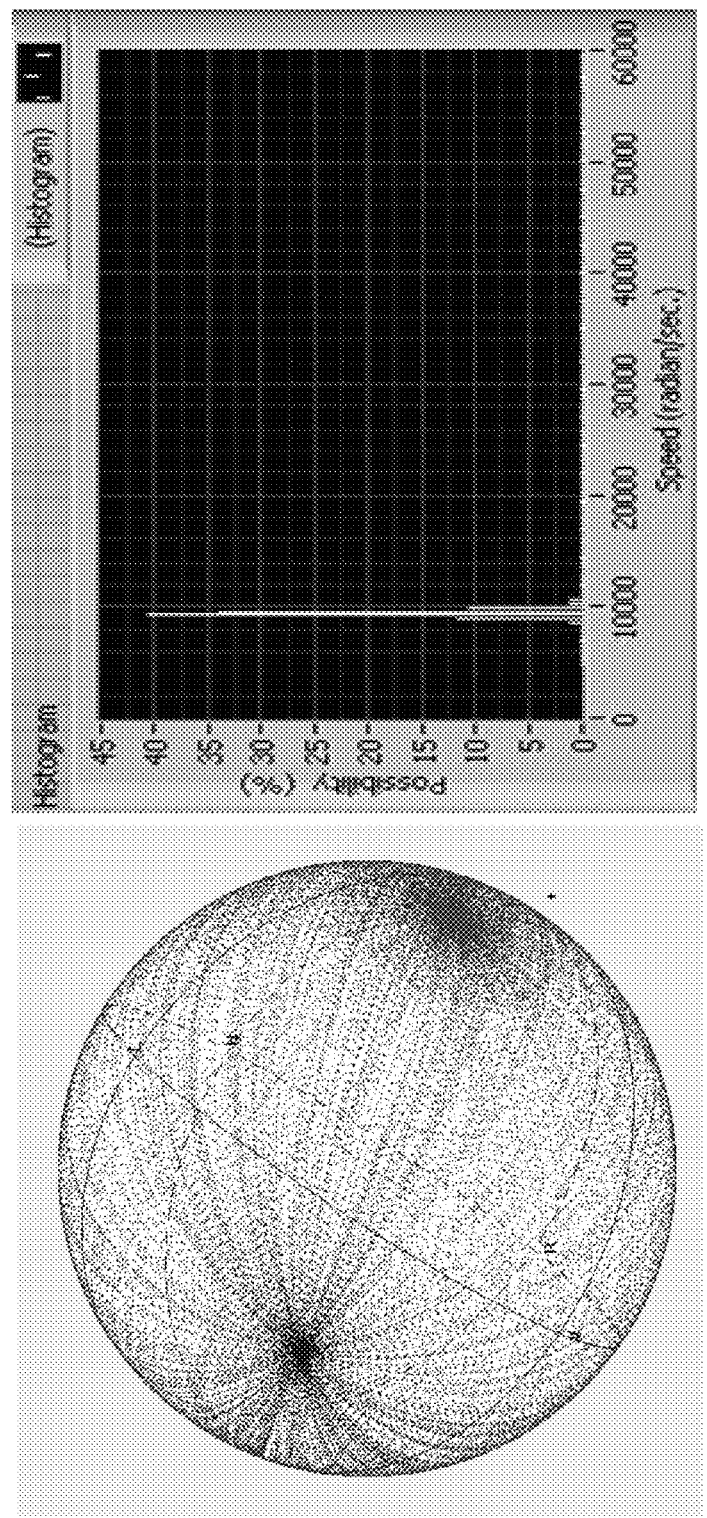
FIG. 5 shows an example of the SOP trace under a uniform rate scrambling technique in operating the device in FIG. 1 or 2.

FIG. 5 shows simulation of the device in FIG. 2 when operated to achieve a uniform rate scrambling. The left hand side figure in FIG. 5 shows the measured SOP trace of the uniform rate scrambling where the trace evolves like a circle spinning around a diametric axis. The right hand side figure shows the polarization scrambling rate histogram showing a single scrambling rate. One way to achieve uniform rate polarization scrambling in the device in FIG. 2 is to align the input SOP 45 degrees from the first fiber squeezer and modulate the first and the second squeezers with triangle waves of $2\pi$ retardation amplitude. The modulation frequency on the first squeezer 111 can be set to be much higher than the modulation frequency on the second fiber squeezer 112 so that the first squeezer 111 causes the SOP go around the Poincaré sphere in a large circle at a high speed, while the second squeezer 112 which is modulated at a lower modulation frequency rotates the large circle in one of its diametric axis, as shown in FIG. 5, to cover the whole sphere completely and uniformly. Tests were conducted in the device in FIG. 2 by using the two different driving frequencies of f1=180 Hz and f2=1.1459 Hz on the fiber squeezers 111 and 112, respectively. The scrambling rate using this approach is uniform, as shown in FIG. 5, because SOP always moves around the great circles of equal radius. The small rate spread is cause by limited sampling point in the polarimeter. The measured 10000-point averaged DOP is about 6.8%, indicating a uniform SOP coverage over entire Poincaré sphere is achieved. The experimental results in FIGS. 3A and 3B also agree with the simulation results of our Labview program under the same driving conditions.

Figure 6:
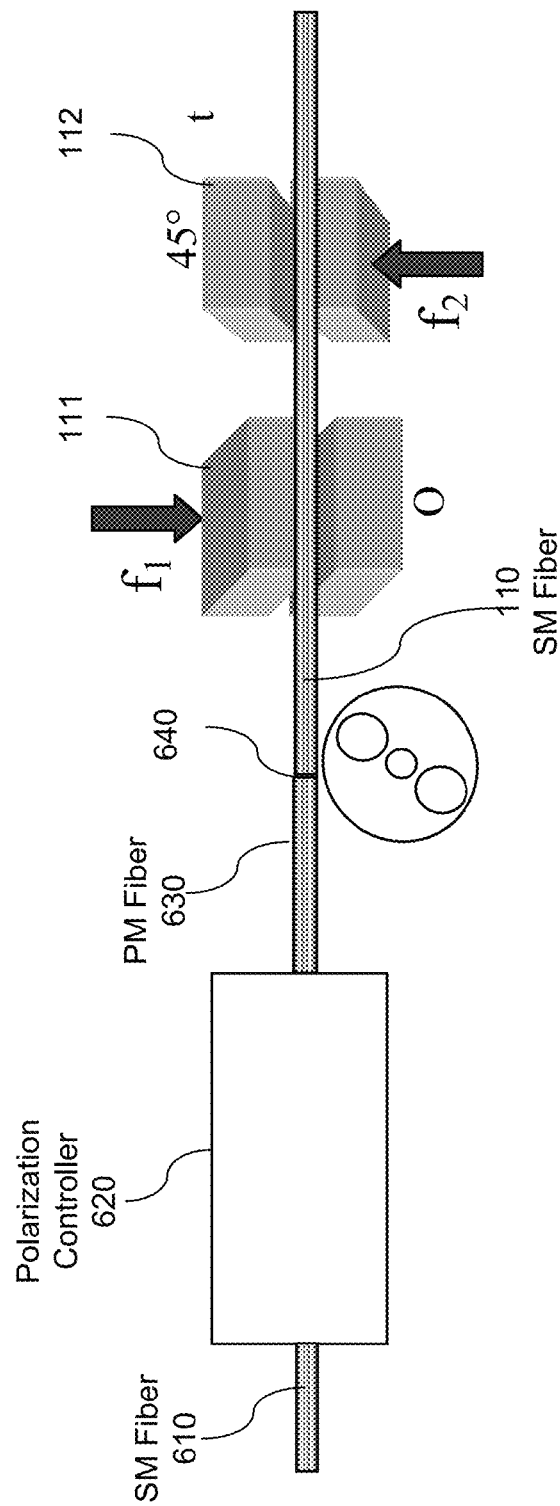
FIG. 6 shows an example of a device design that provides input polarization control.

In practical implementations, the SOP in a real fiber system tends to be non stationary and can vary or fluctuate with time. In order to keep the SOP input to the first fiber squeezer at 45 degrees, a polarization control mechanism can be implemented at the input side. FIG. 6 shows an example for using a PM fiber 630 in front of the fiber squeezers 111 and 112 to control the input polarization to the first fiber squeezer at 45 degrees with respect to the optical axis of the first fiber squeezer 111. The two fiber squeezers 111 and 112 are arranged to have their optical axes at 45 degrees with respect to each other to achieve uniform rate scrambling and, as shown in the example, be operated at different modulation frequencies f1 and f2.

Optionally, a polarization stabilizer or controller 620 can be implemented at the input of the device in FIG. 6 to control the optical polarization in the output light of the device 620 at a fixed output polarization against the variations in the input polarization. FIG. 6 shows an example for using a polarization stabilizer 620 in front of the fiber squeezers 111 and 112 with their optical axes at 45 degrees with respect to each other to achieve uniform rate scrambling.

In FIG. 6, a single mode fiber 610 is provided to direct the input light 102 to the polarization stabilizer 620. The output light with a stabilized polarization produced by the polarization stabilizer 620 is directed into a polarization maintaining (PM) fiber 630 so the stabilized polarization can be preserved. The slow axis of the output PM fiber 630 is aligned 45 degrees from the pressure axis of the first fiber squeezer 111 and is spliced at a splicing joint 640 to the single mode fiber 110 of the fiber squeezer 111. In this design, the output of the second fiber squeezer 112 is the output with randomized polarization. To increase the speed of the device in FIG. 6, two or more fiber squeezers with parallel optical axes along the optical axis of the first fiber squeezer 111 before the first fiber squeezer 111 or between the first and second fiber squeezers 111 and 112.

Notably, the device in FIG. 2 can be operated under a quasi uniform scrambling rate without requiring the input polarization to be at a specific fixed polarization relative to the first fiber squeezer 111. The device in FIG. 2 can be configured to have at least three variable phase retarders oriented 45 degrees from one another. For example, the first two squeezers 111 and 112 can be driven by two triangle waves of different frequencies, with an amplitude of 60 volts for inducing $2\pi$ phase retardation. The $3^{rd}$ squeezer 113, oriented 45 degrees from the $2^{nd}$ squeezer 112, can be driven by a triangle wave of the same amplitude, but a much higher frequency than these of first two squeezers 111 and 112. The frequency relationships of the driving signals on the three squeezers are: $f_3 \gg f_2 \gg f_1$ (or $f_3 \gg f_1 \gg f_2$).

Under this mode of operation, the first two squeezers 111 and 112 cause SOP to vary along certain paths on Poincaré sphere in absence of the operation by the $3^{rd}$ squeezer 113. Taking into account of the operation of the $3^{rd}$ squeezer driving at much higher rate, each SOP point generated by the first two squeezers 111 and 112 becomes the starting point for a complete SOP circle. All the circles have the same rotation axis and rotation direction, although with different diameters. The circle moves back and forth along circle's axis as the SOP changes by the action of the first two squeezers, and eventually covers the whole Poincaré sphere.

Figure 7:
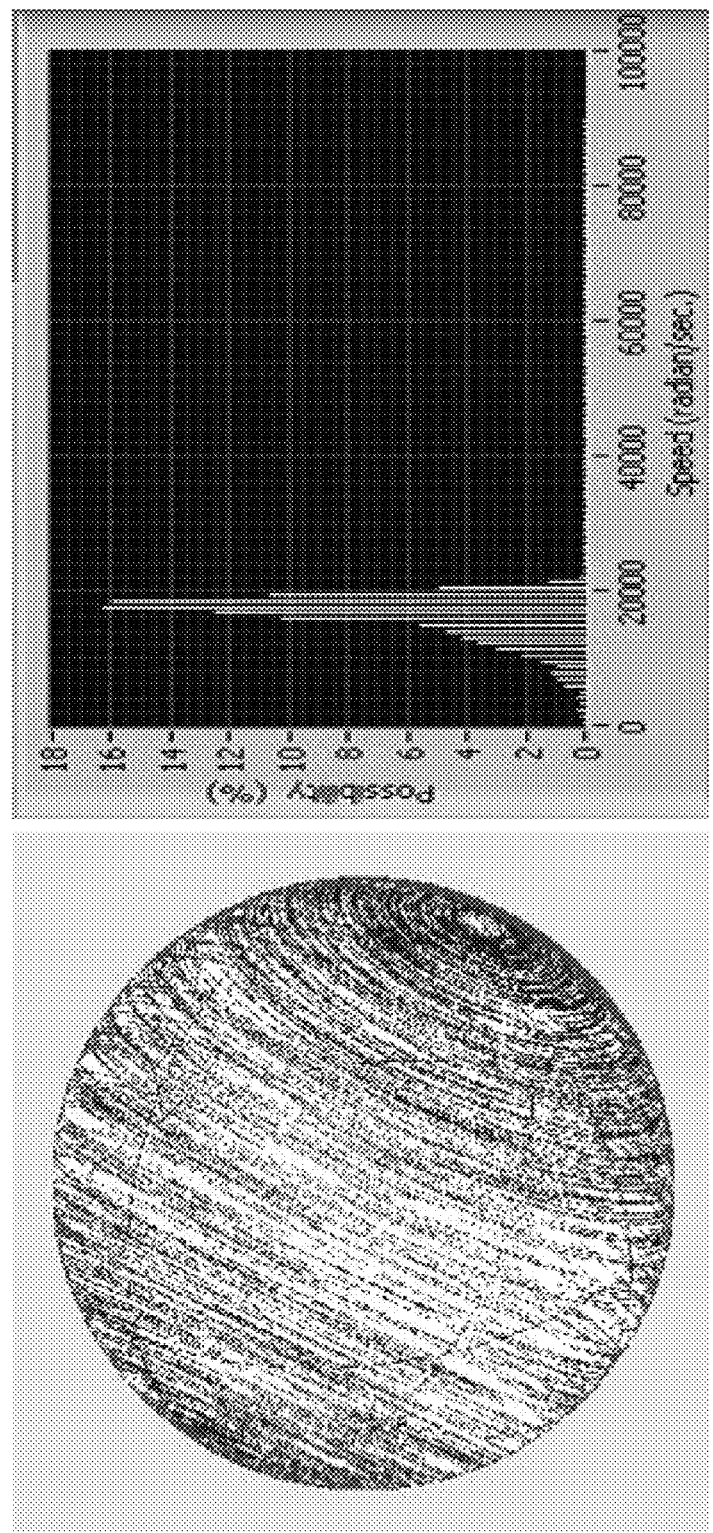
FIG. 7 shows an example of the SOP coverage using a quasi-uniform rate scrambling technique in operating the device in FIG. 1 or 2.

FIG. 7 shows measurements of the SOP trace under the quasi-uniform rate scrambling operation of the device in FIG. 2. SOP rotates around Poincaré sphere at a high speed to form a circle. The left hand side figure shows the experimental result of SOP coverage using the quasi-uniform rate scrambling. The evolution of the SOP trace with time agrees with our reasoning and simulation described above. In obtaining the measurements shown, the three driving signals were triangle waves with 60 volts amplitude for inducing $2\pi$ phase retardation, with frequencies of f1=0.1 Hz, f2=1.414 Hz, and f3=34.6 Hz respectively. Low driving frequencies were chosen for the easy observation of SOP evolution on Poincaré sphere. The measured DOP (10000 point average) is only 3.2%, indicating uniform SOP coverage over the entire sphere.

As shown in the right hand side figure in FIG. 7, the scrambling rate concentrates heavily at the highest end of the rate distribution histogram with a narrow spread. Therefore, the SOP coverage and scrambling rate distribution of this scheme are insensitive to the input polarization variations and no stabilizer is required for implementing the scheme in real systems. Notably, this quasi uniform scrambling mode works equally well for signals of both single polarization and multiplexed polarization, and therefore can be directly used for testing the polarization responses of coherent receivers. Although the scrambling rate in this scheme is not ideally uniform as the device with the input polarization stabilizer in FIG. 6, the performance of this quasi uniform scrambling mode without the input polarization stabilizer can be sufficient for the rapid test of coherent receivers with high repeatability for various applications.

Another aspect of the devices and techniques described in this document is a rate multiplication method for overcoming fiber squeezer speed limitations. Various designs of the optical devices 111-116 may have limited operating speeds. For example, fiber squeezers have a speed limit about $30\pi$ krad/s. Such a speed is not sufficient to achieve certain high scrambling speeds that may be desired in certain applications, e.g., a speed of $100\pi$ krad/s scrambling for testing the performance of coherent receivers in optical communications. The following sections described techniques to extend the speed limit of the fiber squeezers and other implementations of the optical devices 111-116 with limited speeds.

Referring to FIGS. 1, 2 and 6, the optical devices 111-116 are placed in succession. When adjacent devices are figured with the same relative angle in optical axis, the phase retardations add up. If n successively placed fiber squeezers are driven by the same triangle signal with the same modulation frequency, the total phase variation rate of these fiber squeezers is increased by a factor of n. Consequently, if this composite fiber squeezer is used as the $3^{rd}$ squeezer in the quasi-uniform rate scrambling scheme in FIG. 1 or 2, the total scrambling rate will also be increased by a factor of n. Note that this method can be applied to any scrambling device using multiple wave plates.

Therefore, as shown in FIGS. 1 and 2, the devices 113-116 are oriented to have the same optical axis and are modulated at the same modulation frequency f3 to increase the resultant scrambling rate that would not be possible due to the limited speed of each individual device. The number of the devices with the same optical polarization and the same modulation frequency can be adjusted based on the desired additive scrambling rate needed for a specific application.

FIGS. 8A-8E show test results obtained from the device in FIG. 2. The results demonstrate that the SOP variation rate adds up with multiple fiber squeezers oriented in the same directions. In the conducted tests of the device in FIG. 2, the triangle wave for driving the squeezers 113-116 was set at a frequency of 101.9 Hz and a amplitude of 60 volts and caused the SOP to rotate a full circle on Poincaré sphere ($2\pi$ induced phase retardation). FIG. 8A corresponds to the driving triangle wave. FIGS. 8B-8E correspond to the SOP variations as a function of time for fiber squeezers 113, 114, 115, and 116, respectively, without the first two squeezers 111 and 112. The amplitude of the triangle wave was adjusted to induce a full circle on the Poincaré sphere with each squeezer. The manual polarization controller was adjusted so that SOP traces out a great circle on Poincaré sphere. A polarimeter (POD-101D) was used to record SOP variation in the oscilloscope mode when the fiber squeezers were driven with the same signal. Note that the vertical axis is dREF, representing the relative angle between a moving SOP point and a reference SOP point on the SOP circle with a maximum angle of 180 degrees ($\pi$). Therefore, when SOP rotates a complete circle of $2\pi$, dREF moves from 0 to a maximum value of $\pi$, and comes back to 0. As shown in FIG. 8A, in a period of triangle wave for inducing a maximum retardation of $2\pi$, two periods of dREF variation were observed with a single squeezer: one corresponds to voltage ramping up, and the other voltage ramping down. It is evident from FIGS. 8A-8E that when n squeezers are used, 2 n dREF oscillations per triangle wave period is present. The additive effect is immediately evident because with increased number of fiber squeezers in each succeeding curves, the number of dREF period increase per 9.8 ms triangle wave period, indicating that the increase of SOP changing rate is proportional to the number of fiber squeezers n. We also observed the rate additive effect on Poincaré sphere: n fiber squeezers induce n circles per period of the driving signal. A low frequency was chosen in the tests is to demonstrate the concept more clearly because of the limited response time of the polarimeter used in the tests.

Certain fiber coherent optic communication systems may require polarization scrambling with a uniform rate, e.g., at least 300 krad/s for testing its performance with good repeatability. Because coherent systems generally deploy polarization multiplexing, the uniform rate scheme using a polarization stabilizer cannot be used. Here, we describe combining the quasi-uniform rate scrambling scheme with the rate-additive multiple squeezer approach to satisfy the requirements for uniform rate and high-speed scrambling at 376 krad/s.

In the experiment, six fiber squeezers are arranged as in FIG. 2. The last four squeezers are oriented in the same direction and are driven by the same triangle wave with an amplitude of 60 volts and the same phase shift. Because of the rate additive effect, the total phase changing rate is quadrupled and readily achieves a total rate of $120\pi$ krads/s, assuming each squeezer can operate at $30\pi$ krad/s. FIG. 6a shows the measured SOP variation curve using a polarimeter (POD-101D) when frequency and amplitude of the driving triangle signal are set at 7.5 kHz and 60 volts, respectively. As in FIGS. 8A-8E, dREF is recorded as a function of time. Clearly, a SOP variation rate of $120\pi$ krads/s (376 krad/s) is achieved. Note that the data curve is not as clean as those in FIGS. 8A-8E, because the speed of SOP variation is close to instrument's speed limit. When taking the data, the first two fiber squeezers are disabled in order not to affect the rate measurement. When the first two fiber squeezers are enabled, the SOP points immediately fill out the whole Poincaré sphere, and it is difficult to see the SOP evolution.

Figure 9A:
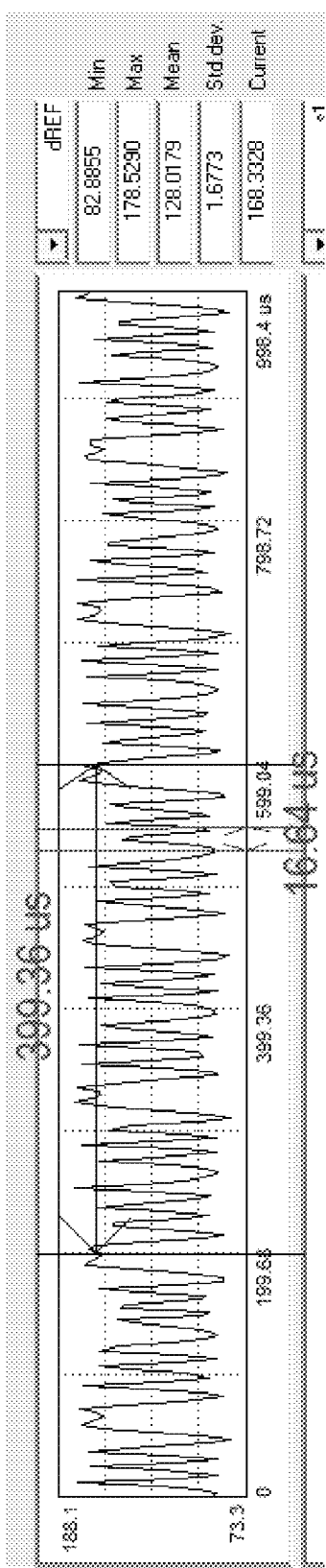
FIGS. 9A and 9B show SOP variations under the quasi uniform rate scrambling in FIG. 2.
Figure 9B:
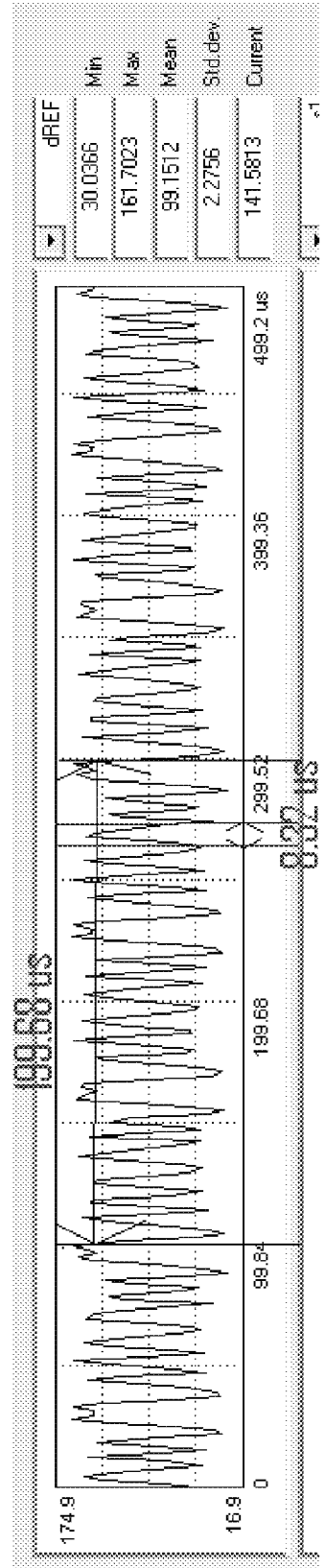

FIGS. 9A and 9B show experiment data (a) for demonstrating quasi-uniform rate scrambling at $120\pi$ krad/s (376 krad/s) and (b) experimental data demonstrating scrambling rate at $240\pi$ krad/s (752 krad/s). With an SOP angle change of $2\pi$ in 16.64 us, the corresponding SOP variation rate is $120\pi$ krad/s ($2\pi/16.64$ us).

Figures 10A, 10B:
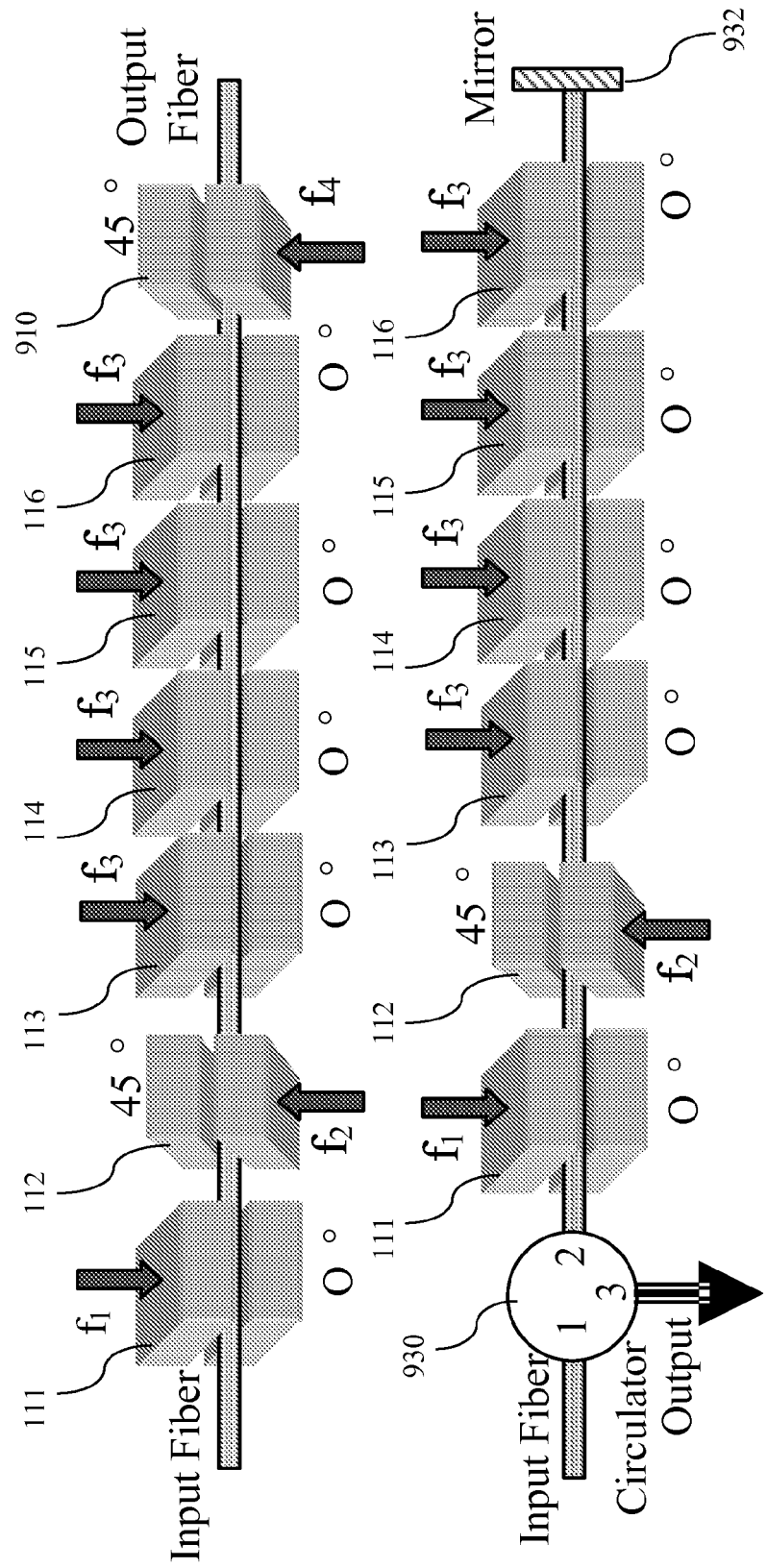
FIGS. 10A and 10B show two optical device designs as additional implementations of the design in FIG. 1.

Other device configurations based on the designs in FIGS. 1, 2 and 6 may be implemented. FIGS. 10A and 10B show two examples.

FIG. 10A shows adding additional one or more optical polarization devices to the device in FIG. 1 to further modulate the phase retardation. In this example, a fiber squeezer 910 oriented at 45 degree with a driving frequency much lower than $f_3$ is added to further rotate the rotation axis of the fast evolving circles shown in FIG. 7.

FIG. 10B shows an example design where an optical reflective device 932, e.g., a reflection mirror, is added at the end of the last squeezer to reflect light back to double pass the fiber squeezers 111-116 based on the design in FIG. 1. The effect is to double the scrambling rate provided by the multiple squeezers 113-116 oriented in the same optical axis direction and driven at the same high frequency f3 and phase. After double pass, the first two squeezers 111 and 112 act to further rotate the orientation of the high speed SOP circles generated by the high speed squeezers 113-116. Under this design, the optical reflective device 932 is coupled to receive light output by the one or more additional optical polarization devices 114-116 (for achieving additive high scrambling rate) and to reflect the received light back to the one or more additional optical polarization devices 114-116 to pass through the third, second and first optical polarization devices 113, 112 and 111, sequentially, to come out of the first optical polarization device 111 as a reflected optical output. An optical routing device 930 is provided to direct the reflected optical output to be separated from the input light received by the first optical polarization device 111.

For example, the optical routing device 930 can be implemented by an optical circulator that includes first, second and third optical ports (1, 2 and 3). In operation, the circulator 930 receives the input light in the first optical port 1, directs the light received at the first optical port 1 to the second optical port 2 that couples to the first optical polarization device 111 to direct the input light from the second optical port 2 into the first optical polarization device 111, and directs light received at the second optical port 2 from the first optical polarization device 111 (reflected light) to the third optical port 3 as an output of the optical circulator 930 that is separated from the input light 102 that is received by the optical circulator 930.

While this patent document contains many specifics, these should not be construed as limitations on the scope of an invention or of what may be claimed, but rather as descriptions of features specific to particular embodiments of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent document.

What is claimed is:

1. An optical device for controlling optical polarization of light, comprising:
   a first optical polarization device that receives input light and is configured to have optical birefringence with a first optical axis perpendicular to a propagation direction of the input light, the first optical polarization device configured to operate on light to produce a first phase retardation on output light that varies with a first control signal applied to the first optical polarization device;
   a second optical polarization device located downstream from the first optical polarization device and configured to have optical birefringence with a second optical axis at 45 degrees with respect to the first optical axis and perpendicular to the propagation direction of received light, the second optical polarization device configured to operate on light to produce a second phase retardation on output light that varies with a second control signal applied to the second optical polarization device;
   a third optical polarization device located downstream from the second optical polarization device and configured to have optical birefringence with a third optical axis at 45 degrees with respect to the second optical axis and perpendicular to the propagation direction of received light, the third optical polarization device configured to operate on light to produce a third phase retardation on output light that varies with a third control signal applied to the third optical polarization device;
   one or more additional optical polarization devices located downstream from the third optical polarization device and each configured to have optical birefringence with an optical axis along the third optical axis, each additional optical polarization device configured to operate on light to produce a respective phase retardation on output light that varies with a respective additional control signal applied to the additional optical polarization device; and
   a control module that produces the first, second, third and one or more additional control signals and modulates each control signal at a respective modulation frequency to vary a respective phase retardation on respective output light produced by a respective optical polarization device, wherein one of the first, second and third control signals is different in modulation frequency from the other two of the first, second and third control signals.

2. The device as in claim 1, wherein:
   a variable wave plate is included one optical polarization device.

3. The device as in claim 2, wherein:
   the variable wave plate is a liquid crystal or electro-ceramic wave plate.

4. The device as in claim 1, comprising:
   a fiber line that guides light through the first, second and third optical polarization devices, and the one or more additional optical polarization devices,
   wherein each of the first, second and third optical polarization devices, and the one or more additional optical polarization devices is a fiber squeezer that is engaged to squeeze the fiber line along a direction perpendicular to the direction of light propagation and to produce a respective phase retardation in the output light.

5. The device as in claim 1, comprising:
   an output optical polarization device located downstream of the one or more additional optical polarization devices each of which is configured to have optical birefringence with an optical axis along the third optical axis, the output optical polarization device configured to operate on light to produce a phase retardation on output light that varies with a control signal applied to the output optical polarization device.

6. The device as in claim 5, wherein:
   the control module is configured to produce the control signal applied to the output optical polarization device at a modulation frequency that is different from a modulation frequency of the one or more additional optical polarization devices.

7. The device as in claim 5, wherein:
   the control module is configured to modulate the one or more additional optical polarization devices at a modulation frequency that is used to modulate the third optical polarization device.

8. The device as in claim 1, comprising:
   a reflective device coupled to receive light output by the one or more additional optical polarization devices and to reflect the received light back to the one or more additional optical polarization devices to pass through the third, second and first optical polarization devices, sequentially, to come out of the first optical polarization device as a reflected optical output;
   an optical routing device that directs the reflected optical output to be separated from the input light received by the first optical polarization device.

9. The device as in claim 8, wherein:
   the optical routing device is an optical circulator that includes first, second and third optical ports, the optical routing device is configured to (1) receive the input light in the first optical port, (2) direct the light received at the first optical port to the second optical port that couples to the first optical polarization device to direct the input light from the second optical port into the first optical polarization device, and (3) direct light received at the second optical port from the first optical polarization device to the third optical port as an output of the optical circulator that is separated from the input light that is received by the optical circulator.

10. The device as in claim 1, wherein:
    the control module is configured to modulate the one or more additional optical polarization devices at a modulation frequency that is used to modulate the third optical polarization device.

11. The device as in claim 1, wherein:
    the control module is configured to produce the third control signal applied to the third optical polarization device at a modulation frequency that is higher than modulation frequencies of the first and second optical polarization devices.

12. The device as in claim 11, wherein:
    the control module is configured to make modulation frequencies of the first and second optical polarization devices to be different.

13. The device as in claim 1, wherein:
    the control module is configured to produce the first control signal applied to the first optical polarization device at a modulation frequency that is higher than a modulation frequency of the second optical polarization device.

14. The device as in claim 1, comprising:
    an input port that receives the input light; and
    an input optical polarization device located between the input port and the first optical polarization device and configured to control an optical polarization of the input light at a desired input optical polarization at 45 degrees with respect to the first optical axis of the first optical polarization device.

15. The device as in claim 14, wherein:
the input optical polarization device includes a polarization controller.

16. The device as in claim 14, wherein:
the input optical polarization device includes a polarization maintaining fiber that directs light to the first optical polarization device where the polarization maintaining fiber is oriented to have a fast or slow optical axis of the polarization maintaining fiber to be at 45 degrees with respect to the first optical axis of the first optical polarization device.

17. The device as in claim 16, wherein:
the first optical polarization device is a fiber squeezer engaged to a single mode fiber which is spliced to the polarization maintaining fiber.

18. The device as in claim 14, wherein:
the input optical polarization device includes an optical polarization stabilizer that stabilizes optical polarization at the desired input optical polarization.

19. The device as in claim 1, wherein:
the control signal applied to each optical polarization device is a periodic triangle wave signal.

20. The device as in claim 1, wherein:
the control signal applied to each optical polarization device to cause a respective phase retardation to vary $2\pi$ in magnitude amplitude.

21. A method for controlling optical polarization of light, comprising:
directing input light through, sequentially, a first optical polarization device configured to have optical birefringence with a first optical axis perpendicular to a propagation direction of the input light, a second optical polarization device configured to have optical birefringence with a second optical axis perpendicular to a propagation direction of received light and at 45 degrees with respect to the first optical axis of the first optical polarization device, a third optical polarization device configured to have optical birefringence with a third optical axis at 45 degrees with respect to the second optical axis of the second optical polarization device, and one or more additional optical polarization devices located downstream from the third optical polarization device and each configured to have an optical axis along the third optical axis;
modulating the first optical polarization device at a first modulation frequency to produce a first modulated phase retardation on light output by the first optical polarization device;
modulating the second optical polarization device at a second modulation frequency to produce a second modulated phase retardation on light output by the second optical polarization device;
modulating the third optical polarization device at a third modulation frequency to produce a third modulated phase retardation on light output by the third optical polarization device; and
modulating the one or more additional optical polarization devices located downstream from the third optical polarization device to produce additional phase retardation modulation on light output from the third optical polarization device,
wherein one of the first, second and third modulation frequencies is different from the other two of the first, second and third modulation frequencies.

22. The method as in claim 21, comprising:
making the first modulation frequency to be higher than the second modulation frequency.

23. The method as in claim 21, comprising:
making the third modulation frequency to be higher than the first and second modulation frequencies.

24. The method as in claim 21, comprising:
directing output light coming out of the one or more additional optical polarization devices into an output optical polarization device configured to have optical birefringence with an optical axis at 45 degrees with respect to the third optical axis of the third optical polarization device;
modulating the output optical polarization device to produce a modulated phase retardation in light output by the one or more additional optical polarization devices.

25. The method as in claim 24, comprising:
operating the output optical polarization device at a modulation frequency that is different from a modulation frequency of the one or more additional optical polarization devices.

26. The method as in claim 21, comprising:
modulating the one or more additional optical polarization devices at the third modulation frequency that is used for modulating the third optical polarization device.

27. An optical device for controlling optical polarization of light, comprising:
optical retardation modulators cascaded to form an optical path that receives input light and produces output light, each optical retardation modulator configured to modulate the input light to produce a phase retardation modulation at a modulation frequency and have optical birefringence with a respective optical axis perpendicular to received light, wherein the first three optical retardation modulators at a beginning part of the optical path are arranged to have their optical axes oriented at 45 degrees between two adjacent optical retardation modulators; and
a control module coupled to the optical retardation modulators to control phase retardation modulation of the optical retardation modulators, respectively, to produce modulation control signals to the first three optical retardation modulators at the beginning side of the optical path at different modulation frequencies and to control optical retardation modulators downstream from the first three optical retardation modulators to control optical polarization and to additionally modulate optical retardation of the light output from the first three optical retardation modulators to scramble optical polarization of the output light.

28. The device as in claim 27, wherein:
some of the optical retardation modulators downstream from the first three optical retardation modulators that are immediate downstream from the first three optical retardation modulators are operated by the control module a common modulation frequency equal to a modulation frequency of the last of the first three optical retardation modulators.

29. A device for controlling optical polarization of light, comprising:
a first optical polarization device that receives input light and is configured to have optical birefringence with a first optical axis perpendicular to a propagation direction of the input light, the first optical polarization device configured to operate on light to produce a first phase retardation on output light that varies with a first control signal applied to the first optical polarization device;
a polarization maintaining fiber that directs light to the first optical polarization device where the polarization maintaining fiber is oriented to have a fast or slow optical axis of the polarization maintaining fiber to be at 45 degrees with respect to the first optical axis of the first optical polarization device;

a second optical polarization device located downstream from the first optical polarization device and configured to have optical birefringence with a second optical axis at 45 degrees with respect to the first optical axis and perpendicular to the propagation direction of received light, the second optical polarization device configured to operate on light to produce a second phase retardation on output light that varies with a second control signal applied to the second optical polarization device; and a control module that produces the first and second control signals and modulates each control signal at a respective modulation frequency to vary a respective phase retardation on respective output light produced by a respective optical polarization device.

30. The device as in claim 29, wherein:

the first optical polarization device is a fiber squeezer engaged to a single mode fiber which is spliced to the polarization maintaining fiber.

31. The device as in claim 29, comprising:

an input polarization stabilizer located upstream from the PM fiber to stabilize polarization of the input light received by the PM fiber.

* * * * *